United States Patent [19]
Bishop et al.

[11] Patent Number: 5,657,437
[45] Date of Patent: Aug. 12, 1997

[54] DATA PROCESSING APPARATUS AND METHOD INCLUDING PROPORTIONAL UPDATING OF DATA

[75] Inventors: David Charles Bishop, Lafayette; Bruce Robinson, Longmont, both of Colo.

[73] Assignee: Lucent Technologies Inc., Murray Hill, N.J.

[21] Appl. No.: 165,276

[22] Filed: Dec. 10, 1993

[51] Int. Cl.$^6$ .................................................. G06F 17/30
[52] U.S. Cl. ..................... 395/764; 395/601; 395/340; 395/356
[58] Field of Search ........................ 395/600, 149, 395/144–148, 150, 155–157, 160, 161

[56] References Cited

U.S. PATENT DOCUMENTS

| | | | |
|---|---|---|---|
| 4,989,141 | 1/1991 | Lyons et al. | 364/408 |
| 5,055,998 | 10/1991 | Wright et al. | 395/600 |
| 5,115,504 | 5/1992 | Belove et al. | 395/600 |
| 5,231,577 | 7/1993 | Koss | 395/148 X |
| 5,255,356 | 10/1993 | Michelman et al. | 395/148 |
| 5,293,615 | 3/1994 | Amada | 395/600 |
| 5,312,478 | 5/1994 | Reed et al. | 395/148 |
| 5,317,686 | 5/1994 | Salas et al. | 395/157 |
| 5,339,410 | 8/1994 | Kahai | 395/600 |
| 5,359,724 | 10/1994 | Earle | 395/425 |
| 5,418,898 | 5/1995 | Zand et al. | 395/137 |
| 5,423,033 | 6/1995 | Yuen | 395/600 |

*Primary Examiner*—Paul V. Kulik

[57] ABSTRACT

A hierarchical database reporting and updating system is disclosed. The invention makes unique use of bit vectors to represent the relationship between various data items to enable the system to provide powerful data analysis functions. The data structure allows users to change values which represent intermediate or grand summary levels. Such changes are prorated across all lower level data items which make up the intermediate or grand summary level. The invention also allows for the graphical representation of data. Users may modify these graphical representations and the system will update the underlying data.

34 Claims, 28 Drawing Sheets

| Record Number | Div. | Lab. | Dep. | Acct. | Subacct. | Cust. | Proj. | Amount |
|---|---|---|---|---|---|---|---|---|
| 1 | A | aa | aa1 | 11 | 11.x | WFO | sss | 123.00 |
| 2 | A | aa | aa1 | 22 | 22.x | BTL | ttt | 234.00 |
| 3 | A | aa | aa2 | 33 | 33.y | ATT | uuu | 345.00 |
| 4 | A | aa | aa2 | 44 | 44.y | IRS | vvv | 456.00 |
| 5 | A | ab | ab1 | 11 | 11.y | WFO | lll | 321.00 |
| 6 | A | ab | ab1 | 22 | 22.y | BTL | mmm | 432.00 |
| 7 | A | ab | ab2 | 55 | 55.z | ATT | nnn | 543.00 |
| 8 | A | ab | ab3 | 66 | 66.x | IRS | ooo | 654.00 |
| 9 | B | ba | ba1 | 11 | 11.y | WFO | sss | 121.00 |
| 10 | B | ba | ba2 | 22 | 22.z | BTL | ttt | 232.00 |
| 11 | B | bb | bb1 | 44 | 44.x | ATT | uuu | 343.00 |
| 12 | B | bb | bb2 | 77 | 77.y | IRS | vvv | 454.00 |
| 13 | B | bc | bc1 | 22 | 22.z | WFO | lll | 313.00 |
| 14 | C | ca | ca1 | 33 | 33.z | BTL | mmm | 424.00 |
| 15 | C | cb | cb1 | 88 | 88.x | ATT | nnn | 666.00 |

Fig. 5

| | | | |
|---|---|---|---|
| aa1 | | 110000000000000 | ⟵1004 |
| aa2 | | 001100000000000 | |
| | aa | 111100000000000 | |
| ab1 | | 000011000000000 | |
| ab2 | | 000000100000000 | |
| ab3 | | 000000010000000 | ⟵1006 |
| | ab | 000011110000000 | ⟵1010 |
| | A | 111111110000000 | |
| ba1 | | 000000001000000 | |
| ba2 | | 000000000100000 | |
| | ba | 000000001100000 | |
| bb1 | | 000000000010000 | |
| bb2 | | 000000000001000 | |
| | bb | 000000000011000 | |
| bc1 | | 000000000000100 | |
| | bc | 000000000000100 | |
| | B | 000000001111100 | |
| ca1 | | 000000000000010 | |
| | ca | 000000000000010 | |
| cb1 | | 000000000000001 | |
| | cb | 000000000000001 | |
| | C | 000000000000011 | ⟵1008 |
| | ORG | 111111111111111 | |

Fig. 10

```
             1104
nnn          000000100000001
uuu          001000000010000    1106
    ATT      001000100010001
mmm          000001000000010
ttt          010000000100000
    BTL      010001000100010
ooo          000000010000000
vvv          000100000001000
    IRS      000100010001000
lll          000010000000100
sss          100000001000000
    WFO      100010001000100
       PROJECT 111111111111111
```

1102 points to the left column; 1104/1106 point to the right column.

Fig. 11

|     | BTL | ATT | PROJECT |
|-----|-----|-----|---------|
| aa  | 234.00 | 345.00 | 579.00 |
| ab  | 432.00 | 543.00 | 975.00 |
| A   | 666.00 | 888.00 | 1554.00 —1702 |
| ba  | 232.00 |        | 232.00 |
| bb  |        | 343.00 | 343.00 |
| B   | 232.00 | 343.00 | 575.00 |
| ORG | 898.00 | 1231.00 | 2129.00 |

Fig. 17

|     | BTL | ATT | PROJECT |
|---|---|---|---|
| aa | 327.60 | 483.00 | 810.60 |
| ab | 604.80 | 760.20 | 1365.00 |
| A | 932.40 | 1243.20 | 2175.60 |
| ba | 232.00 |  | 232.00 |
| bb |  | 343.00 | 343.00 |
| B | 232.00 | 343.00 | 575.00 |
| ORG | 1164.40 | 1586.20 | 2750.60 |

Fig. 18

SELECT:

ORG
| Div | ALL |
| Lab | |
| Dep | |

PROJECT
| Cust | ATT, BTL |
| Proj | ALL |

ACCT
| Acct | ALL |
| Subacct | |

Fig. 19

| Record Number | ORGANIZATION | | | ACCOUNT | | PROJECT | | Amount |
|---|---|---|---|---|---|---|---|---|
| | Div. | Lab. | Dep. | Acct. | Subacct. | Cust. | Proj. | |
| 1 | A | aa | aa1 | 11 | 11.x | WFO | sss | 123.00 |
| 2 | A | aa | aa1 | 22 | 22.x | BTL | ttt | 327.60 |
| 3 | A | aa | aa2 | 33 | 33.y | ATT | uuu | 483.00 |
| 4 | A | aa | aa2 | 44 | 44.y | IRS | vvv | 456.00 |
| 5 | A | ab | ab1 | 11 | 11.y | WFO | lll | 321.00 |
| 6 | A | ab | ab1 | 22 | 22.y | BTL | mmm | 604.80 |
| 7 | A | ab | ab2 | 55 | 55.z | ATT | nnn | 760.20 |
| 8 | A | ab | ab3 | 66 | 66.x | IRS | ooo | 654.00 |
| 9 | B | ba | ba1 | 11 | 11.y | WFO | sss | 121.00 |
| 10 | B | ba | ba2 | 22 | 22.z | BTL | ttt | 232.00 |
| 11 | B | bb | bb1 | 44 | 44.x | ATT | uuu | 343.00 |
| 12 | B | bb | bb2 | 77 | 77.y | IRS | vvv | 454.00 |
| 13 | B | bc | bc1 | 22 | 22.z | WFO | lll | 313.00 |
| 14 | C | ca | ca1 | 33 | 33.z | BTL | mmm | 424.00 |
| 15 | C | cb | cb1 | 88 | 88.x | ATT | nnn | 666.00 |
| 16 | C | ca | ca1 | 22 | 22.x | ATT | nnn | 16.00 |
| 17 | C | ca | ca1 | 22 | 22.x | ATT | uuu | 16.00 |
| 18 | C | ca | ca1 | 22 | 22.x | BTL | mmm | 16.00 |
| 19 | C | ca | ca1 | 22 | 22.x | BTL | ttt | 16.00 |
| 20 | C | ca | ca1 | 22 | 22.y | ATT | nnn | 16.00 |
| 21 | C | ca | ca1 | 22 | 22.y | ATT | uuu | 16.00 |
| 22 | C | ca | ca1 | 22 | 22.y | ATT | mmm | 16.00 |
| 23 | C | ca | ca1 | 22 | 22.y | BTL | ttt | 16.00 |
| 24 | C | ca | ca1 | 22 | 22.z | BTL | nnn | 16.00 |
| 25 | C | ca | ca1 | 22 | 22.z | ATT | uuu | 16.00 |
| 26 | C | ca | ca1 | 22 | 22.z | ATT | mmm | 16.00 |
| 27 | C | ca | ca1 | 22 | 22.z | ATT | ttt | 16.00 |
| 28 | C | cb | cb1 | 22 | 22.x | BTL | nnn | 16.00 |
| 29 | C | cb | cb1 | 22 | 22.x | BTL | uuu | 16.00 |
| 30 | C | cb | cb1 | 22 | 22.x | ATT | mmm | 16.00 |
| 31 | C | cb | cb1 | 22 | 22.x | ATT | ttt | 16.00 |
| 32 | C | cb | cb1 | 22 | 22.y | ATT | nnn | 16.00 |
| 33 | C | cb | cb1 | 22 | 22.y | BTL | uuu | 16.00 |
| 34 | C | cb | cb1 | 22 | 22.y | BTL | mmm | 16.00 |
| 35 | C | cb | cb1 | 22 | 22.y | ATT | ttt | 16.00 |
| 36 | C | cb | cb1 | 22 | 22.z | ATT | nnn | 16.00 |
| 37 | C | cb | cb1 | 22 | 22.z | ATT | uuu | 16.00 |
| 38 | C | cb | cb1 | 22 | 22.z | BTL | mmm | 16.00 |
| 39 | C | cb | cb1 | 22 | 22.z | BTL | ttt | 16.00 |

DATA PROCESSING APPARATUS AND METHOD INCLUDING PROPORTIONAL UPDATING OF DATA

FIELD OF THE INVENTION

This invention relates generally to an improved data management system and method. More particularly, the present invention relates to a hierarchical database reporting and updating system.

BACKGROUND OF THE INVENTION

Current computer systems exist for the display and manipulation of data in a spreadsheet-like format. These systems generally display various column headings and row identifiers, with the intersection of the rows and columns containing values.

In the presently existing systems, data in the spreadsheet can be summarized. For example, the data for an entire column could be summed and the sum would be displayed as a total in a summary level. When various quantities are changed in a column, the summary level can be automatically updated to reflect these changes. In existing systems however, a change made to a summary level cannot be prorated back through the data items which make up that summary level.

Many spreadsheet systems and database systems have graphics capabilities. These capabilities allow the representation of the data in graphical form. Some of these systems allow real-time update of graphs as data is changed. Present systems however, do not allow the underlying data to be changed by modifying the graph.

SUMMARY OF THE INVENTION

The present invention provides an improved method and system for data management. Data is organized in a hierarchical structure, which allows users greater flexibility in data reporting and updating. The invention makes unique use of bit vectors to represent the relationship between various data items to enable the system to provide powerful data analysis functions not previously available.

The data structures employed in the invention allow users to change values which represent intermediate or grand summary levels. Such changes are prorated across all lower level data items which make up the intermediate or grand summary level.

The graphical abilities of the present invention allow for various graphical presentations of the data. Various hierarchies of data may be represented in graphical form. Additionally, the invention has the ability to allow a user to make a change to a graphical display and to change the underlying data which is represented by the graphical display.

DESCRIPTION OF THE DRAWINGS

FIG. 5 shows the sample database.

FIG. 10 shows the dimension layout and associated bit vectors for the ORGANIZATION hierarchy.

FIG. 11 shows the dimension layout and associated bit vectors for the PROJECT hierarchy.

FIG. 17 shows a spreadsheet display for the selection criteria shown in FIG. 16.

FIG. 18 shows a spreadsheet display after changing a summary level value and prorating the change across detail levels.

FIG. 19 shows an example of selection criteria.

FIG. 22 illustrates adding various combinations of new records after a value is added to an empty cell.

DETAILED DESCRIPTION

Figure 1:
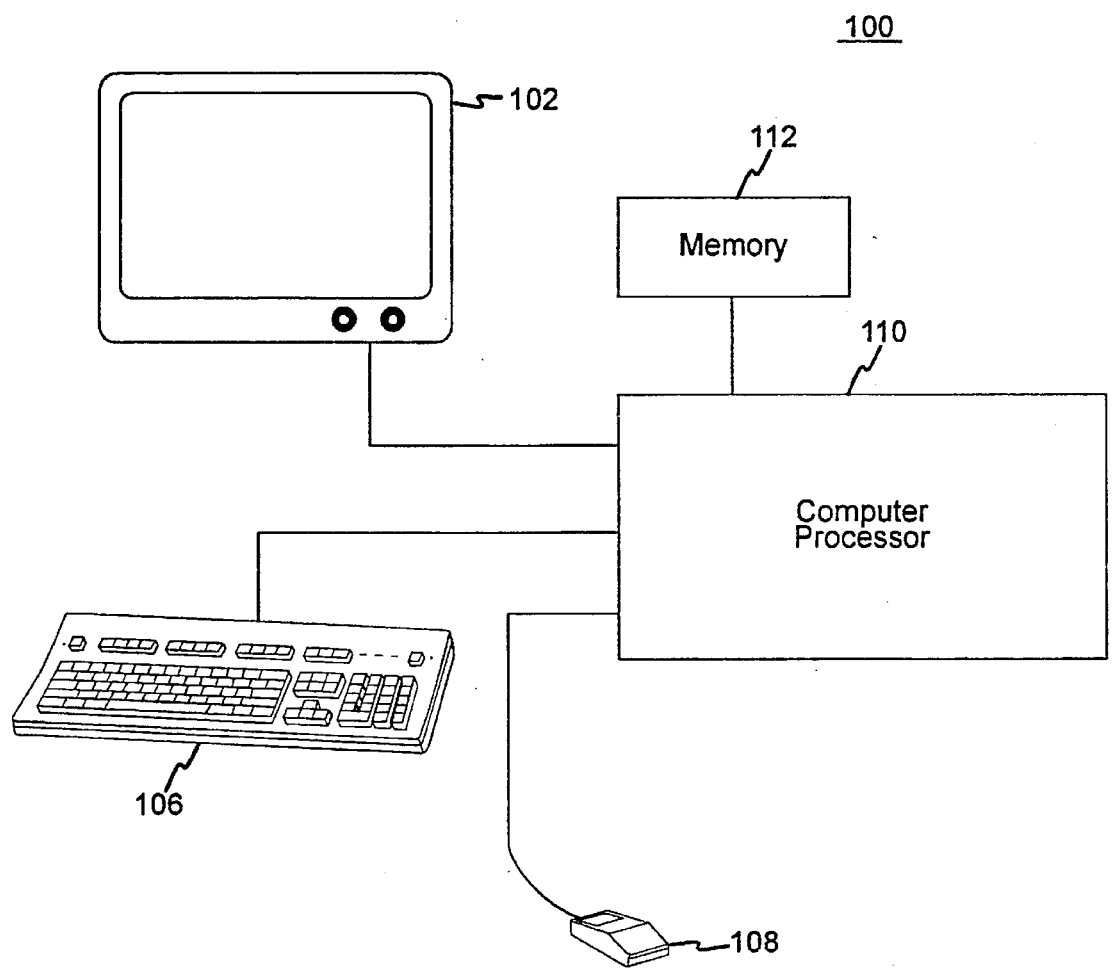
FIG. 1 shows a schematic of the components of a system according to the present invention.

The present invention may be implemented using a general purpose computer system 100 as illustrated in FIG. 1. FIG. 1 shows the general purpose computer system 100 which comprises a display monitor 102 for the display of graphical and textual information, a keyboard 106 for textual entry of information, a mouse 108 for the entry of graphical data, a computer processor 110, and a memory 112 for the storage of data items. The computer processor 110 is connected to the memory 112, the display monitor 102, the keyboard 106, and the mouse 108. Other graphical entry devices, such as a light pen (not shown) can be substituted for the mouse. The general purpose computer 100 may suitably be any one of the types which are well known in the art such as a mainframe computer, a minicomputer, a workstation, or a personal computer. In one embodiment of the invention, the computer processor contains program code to implement the invention.

Figure 2:
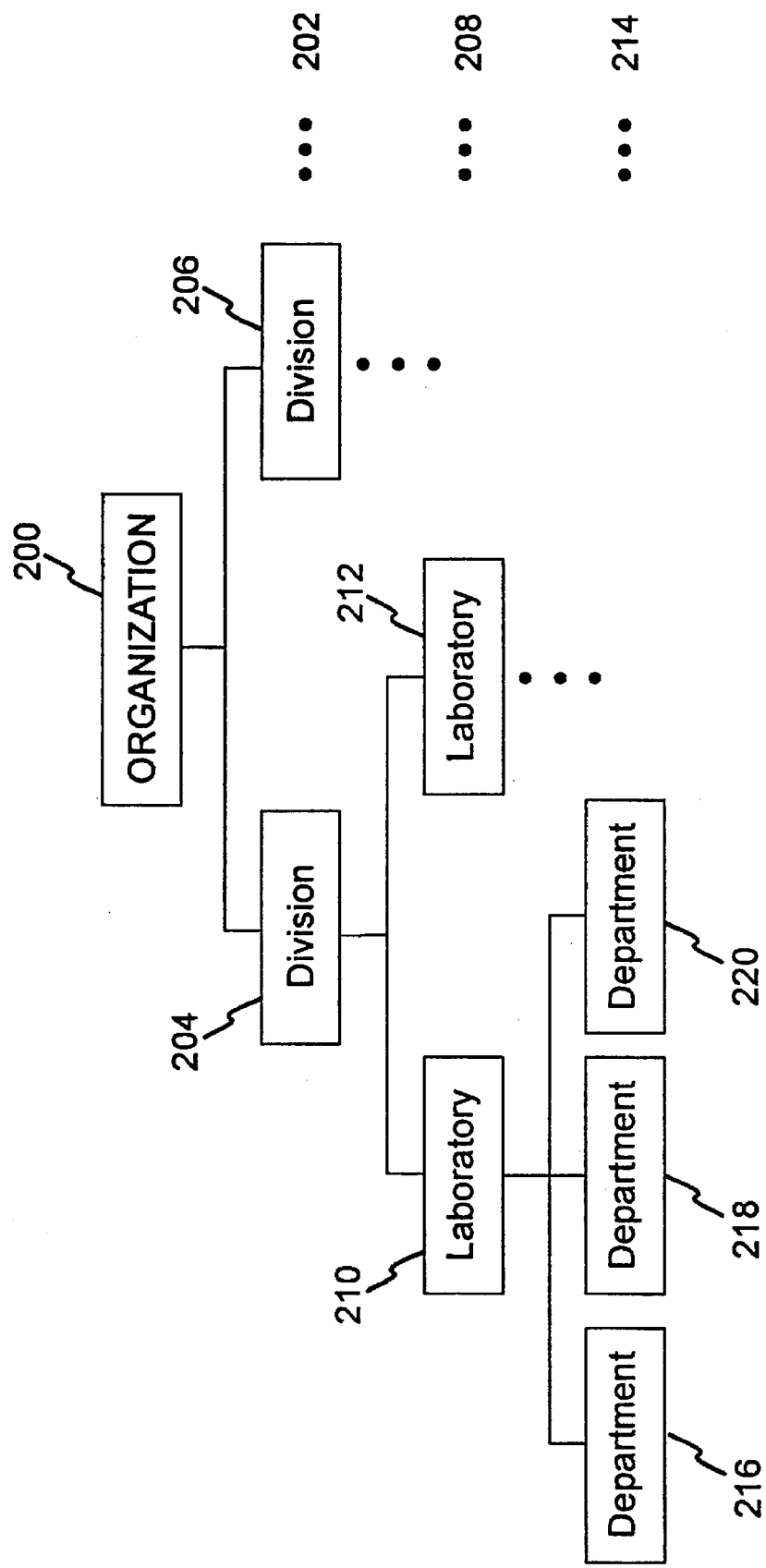
FIG. 2 shows the ORGANIZATION hierarchy.

An embodiment of the invention will be described in connection with several specific examples of database applications. Assume a data file with seven key fields and one quantity field. The key fields of the data file define unique records. Thus, for every combination of key fields there may be one record. The seven key fields are: DIVISION, LABORATORY, DEPARTMENT, ACCOUNT, SUBACCOUNT, CUSTOMER, and PROJECT. The quantity field is AMOUNT. This data file contains three hierarchies. A hierarchy is a set of data items which are related to each other on various levels. Another term for hierarchy is "tree". FIG. 2 shows the ORGANIZATION hierarchy 200.

In the examples which follow, a hierarchy is topped by its name. In this example, the ORGANIZATION hierarchy 200 is subordinated by levels, with each level containing one or more unique values, or nodes. Each of those values may in turn be subdivided by an even lower level, until the bottom is reached. In the example of FIG. 2, the ORGANIZATION hierarchy 200 is subordinated by a Division level 202 which may include a plurality of values or nodes. In FIG. 2, two unique Division values or nodes, 204, 206 are shown. The Division level 202 is further subordinated by a Laboratory level 208. Thus, each node in the Division level 204, 206 is sub-divided by the Laboratory level 208 which may similarly contain a plurality of values or nodes. In FIG. 2, two unique Laboratory values or nodes, 210, 212 are shown. The Laboratory level 208 is in turn further subordinated by the Department level 214 which may contain a plurality of values or nodes. In FIG. 2, three unique Department values or nodes 216, 218, 220, are shown.

Figure 3:
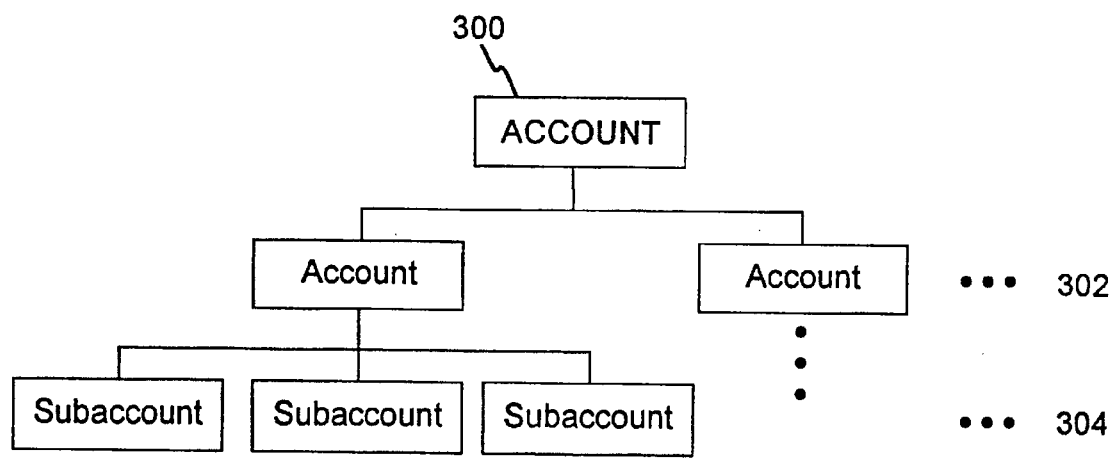
FIG. 3 shows the ACCOUNT hierarchy.

Another data hierarchy or tree is the ACCOUNT hierarchy 300, which is illustrated in FIG. 3. The ACCOUNT Hierarchy 300 consists of the Account and Subaccount levels 302 and 304, with each level capable of centaining multiple unique values, or nodes, as discussed above in connection with FIG. 2.

Figure 4:
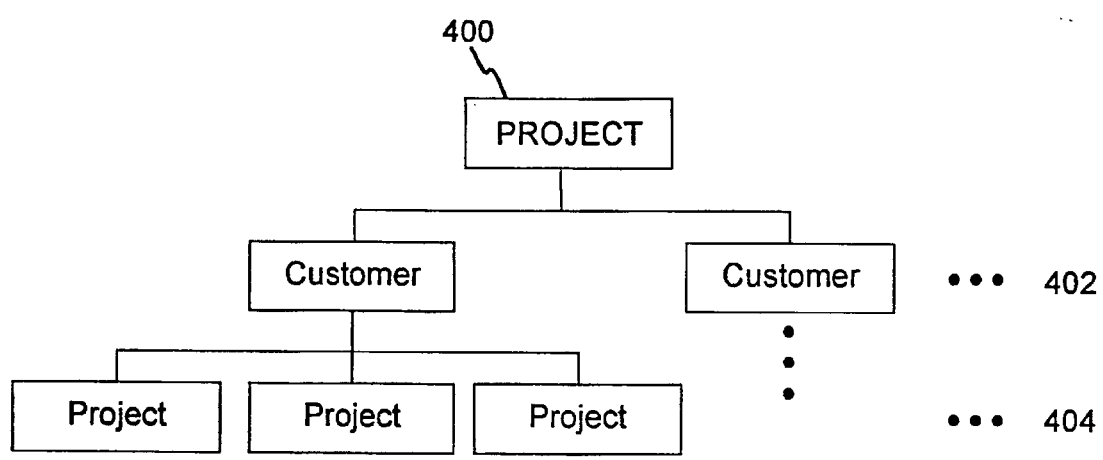
FIG. 4 shows the PROJECT hierarchy.

Similarly, the PROJECT hierarchy 400, shown in FIG. 4, consists of Customer and Project levels 402 and 404, with each level containing multiple unique values, or nodes.

A sample database file 500 is shown in FIG. 5. The database 500 contains a column for each level in each hierarchy. Thus, the columns of the database 500 are Division 502, Laboratory 504, Department 506, Account 508, Subaccount 510, Customer 512, and Project 514. In addition, there is one column for each quantity field. In this example, there is only one quantity field, Amount 516. A record number column 518 is implied and is shown for ease of reference. It does not physically exist in the data file.

Figure 6:
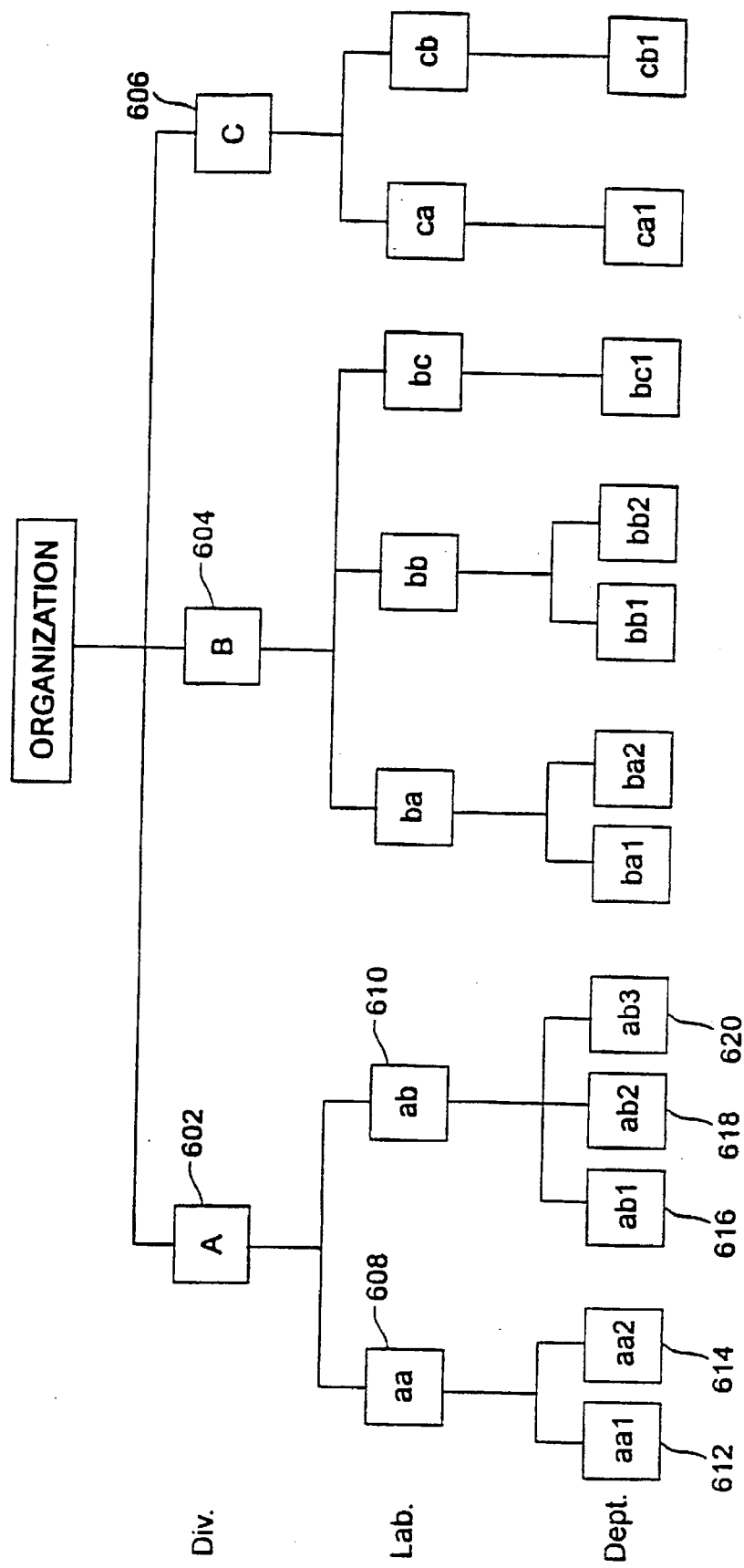
FIG. 6 shows the ORGANIZATION hierarchy using the data shown in FIG. 5.
Figure 7:
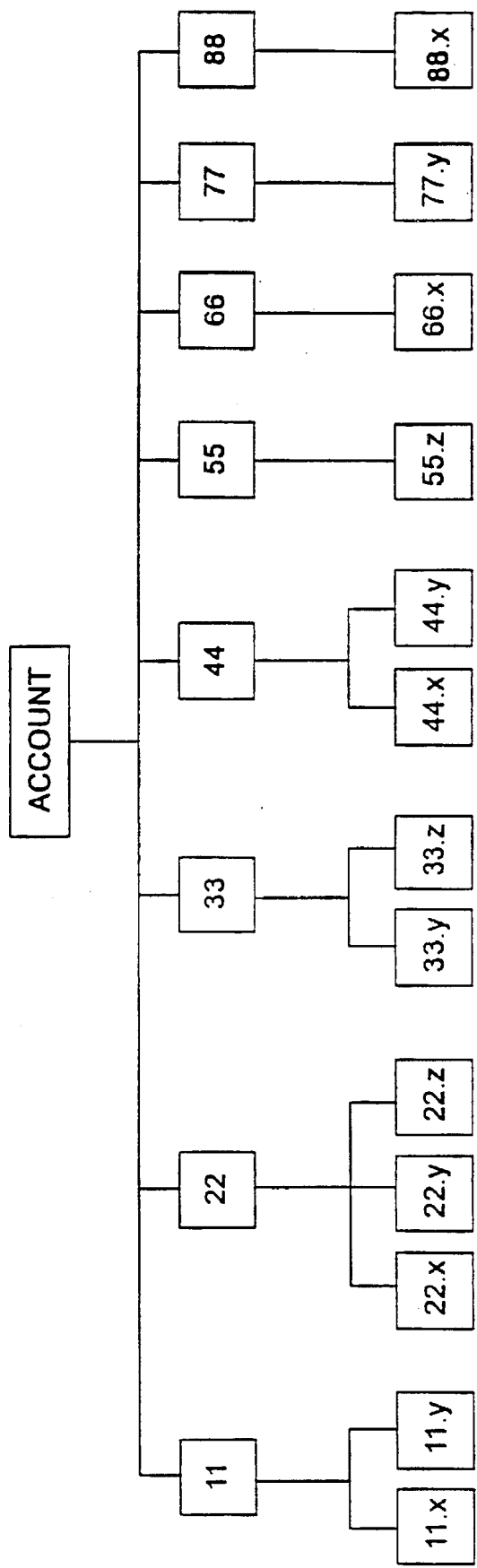
FIG. 7 shows the ACCOUNT hierarchy using the data shown in FIG. 5.
Figure 8:
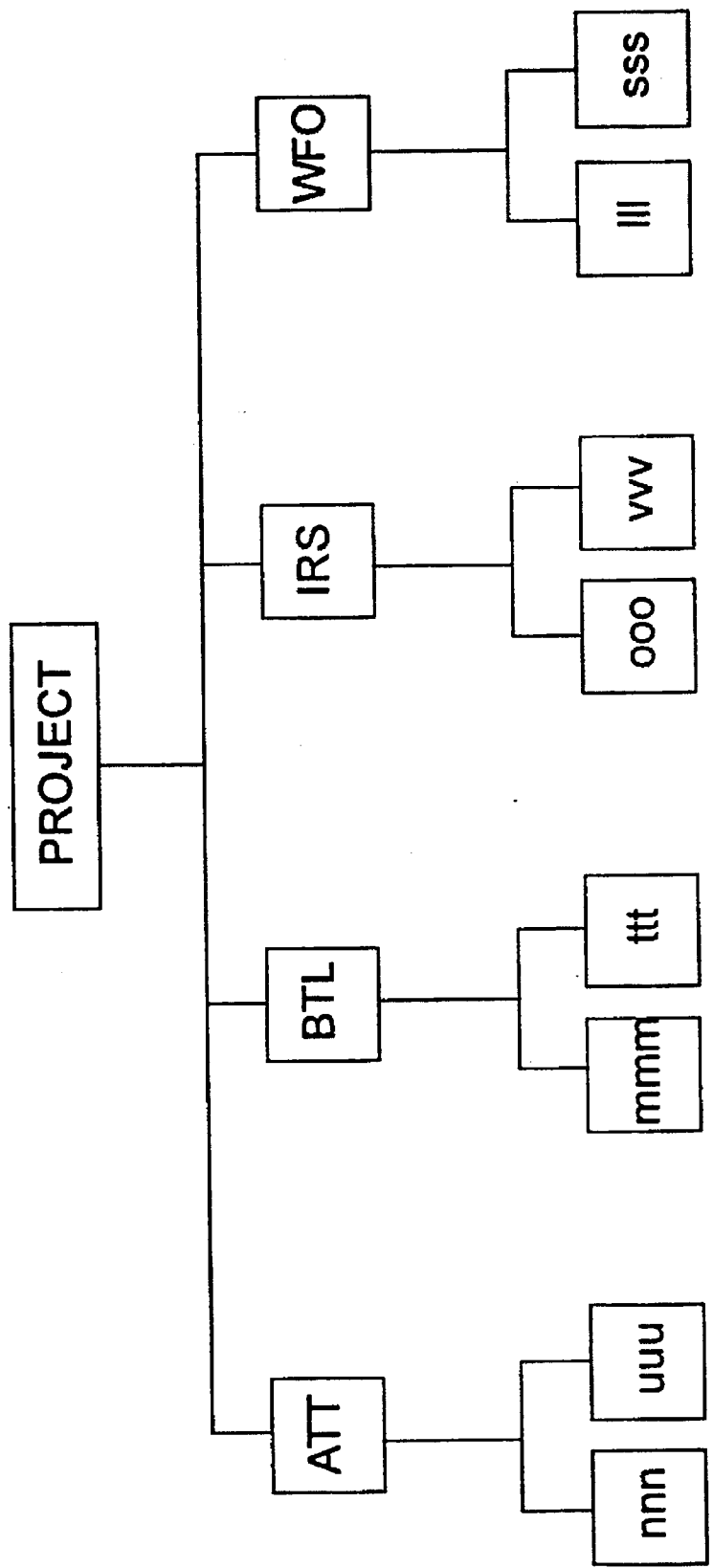
FIG. 8 shows the PROJECT hierarchy using the data shown in FIG. 5.

Using the data from FIG. 5, the relationships of the values or nodes within the tree structure for the ORGANIZATION hierarchy is further illustrated in FIG. 6. There are three unique Division values, A, B, and C, in database 500 in the Division column 502. Thus, FIG. 6 shows three nodes in the Division level 602, 604, 606. Division A is further subdivided into a Laboratory level having two unique Laboratory values aa and ab as seen in the portion of the Laboratory column 504 corresponding to the portion of the Division column 502 containing the value A. Thus, there are two Laboratory-nodes subdividing Division A, 608 (node aa), 610 (node ab). Laboratory node aa 608 is further subdivided into two unique Departments, aa1 and aa2. These are shown by nodes 612 and 614. The remainder of the tree shown in FIG. 6 is constructed in a similar manner. The tree structure for the ACCOST hierarchy for the database 500 is similarly illustrated in FIG. 7. The tree structure for the PROJECT hierarchy for the database 500 is illustrated in FIG. 8.

Figure 9:
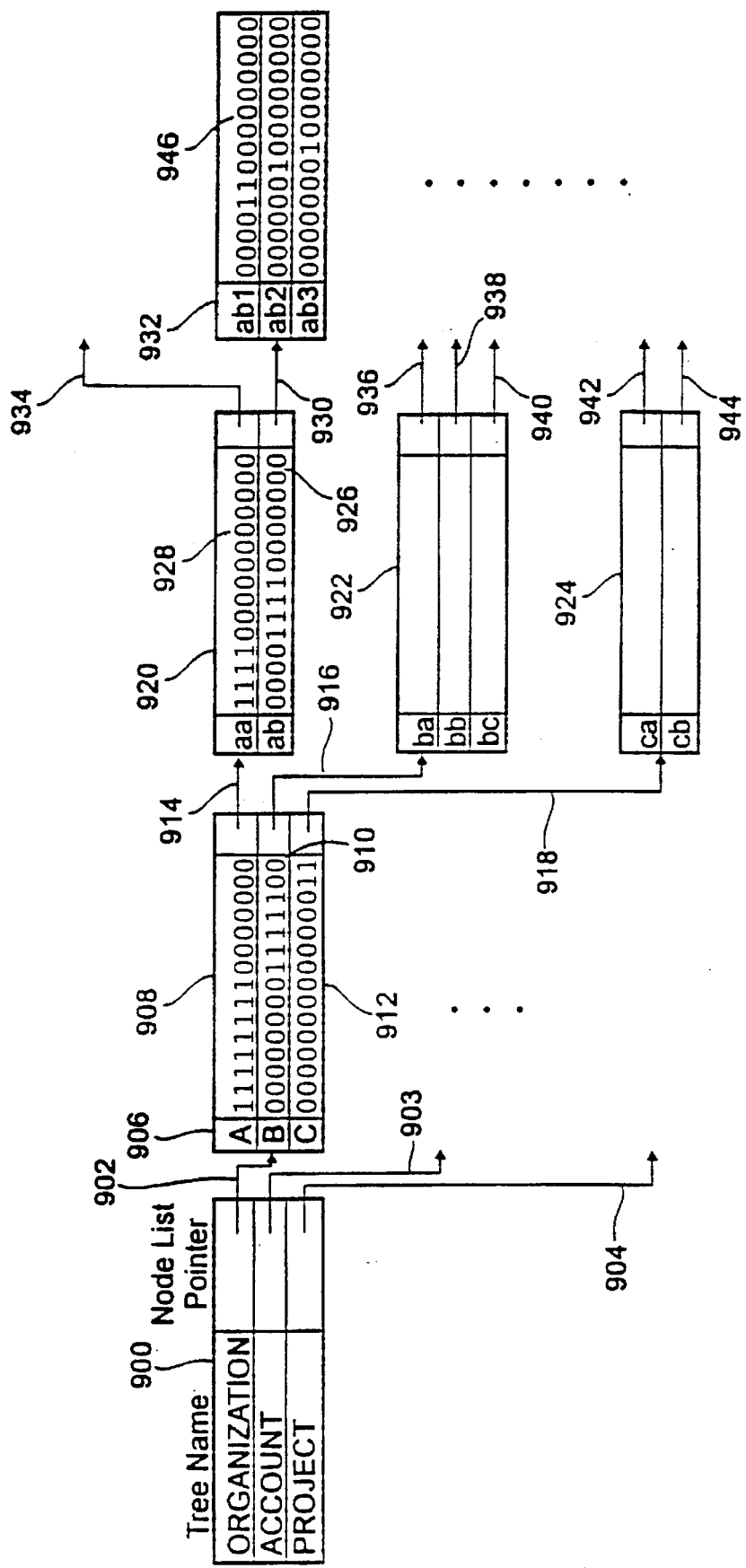
FIG. 9 is a diagram showing a tree list and node lists.

The following discussion explains how these trees are represented in the memory 112 of a computer system such as the computer system 100 (FIG. 1). Each hierarchy defined in a tree model is represented in a tree list 900 as illustrated in FIG. 9. The tree list 900 contains the name of each tree being modeled. Thus, in this example, the tree list 900 contains the name of three trees; Organization 200 (FIG. 2), Account 300 (FIG. 3), and Project 400 (FIG. 4). The tree list 900 also contains a node list pointer for each tree. This pointer points to a node list for the first level of the tree and may be of any suitable type well known in the art. For example, the node list pointer could be a memory address at which the desired data structure is located. It could also be a physical pointer into a file, or a relative file address. In the present example, the first subordinate level of the Organization tree 200 is the Division level 202. Thus, the tree list 900 contains the pointer 902 associated with the Organization tree 200 which points to the Division level node list 906. Although corresponding node lists are not shown in FIG. 9, the tree list 900 contains similar pointers 903, 904, to the Account tree 300 and the Project tree 400.

A node list such as the node list 906, is a list of all of the unique values in the corresponding data column. For example, the Division level node list 906 for the ORGANIZATION hierarchy 200 contains the three values A, B and C, the unique values in the Division column 502 of FIG. 5. Similarly, referring to FIG. 6, A, B, and C, are the unique nodes 602, 604, 606 in the Division level. For each unique value in the node list, there is an associated bit vector. For ease of reference, FIG. 9 shows these bit vectors as part of the, node lists. However, in the preferred embodiment, the node lists would contain pointers to the associated bit vectors. As discussed above in conjunction with node list pointers, these bit vector pointers may be of any suitable type well known in the art. The bit vector is used as an indication of which records in the database contain a certain unique value. Each bit vector is as wide in bits as the data file is long in rows. In the example under discussion the bit vector for node A 908 is 15 bits wide, as there are 15 records or rows in the sample database shown in FIG. 5. In the bit vector, each bit positionally represents a row in the data file. If the bit is on (contains a 1), then that record contains the unique value which corresponds to that bit vector. If the bit is off (contains a 0), then the unique value is absent from that record number. For example, node list 906 contains a bit vector 908 associated with node A. That bit vector 908 is 15 bits wide and bits 1 through 8 are on, and bits 9 through 15 are off. This indicates that records 1 through 8 in the database 500 contain the value A in the Division column 502, and that records 9 through 15 do not contain value A in the Division column 502. In a similar manner, bit vector 910 for node B indicates that database records 9 through 13 contain a B in the Division column 502 and that database records 1 through 8, 14 and 15 do not contain a B in the Division column 502. The bit vector 912 for Node C indicates that database records 14 and 15 contain a C in the Division column 502 and that records 1 through 13 do not contain a C in the Division column 502.

In addition to bit vectors 908, 910, 912 for each unique value A, B, C, in the node list 906, the node list 906 also contains a pointer to the subordinate node list 920, 922, 924 which subordinates each unique value. For example, in the node list 906, node A has a pointer 914 pointing to a Laboratory level node list 920. Referring back to FIG. 6, it is seen that Division A node 602 is subordinated by Laboratory nodes aa 608 and ab 610. Thus, the node list 920 contains the values aa and ab.

In a similar manner, the node list 906 will have pointers associated with Division B and Division C. The pointer 916 associated with Division B will point to Laboratory level node list 922 which contains the values ba, bb, and bc. The pointer 918 associated with Division C will point to a Laboratory level node list 924 which contains the values ca and cb.

Similar to the Division level node list 906, the Laboratory level node lists 920, 922, 924 also contain bit vectors for each unique value. Thus, value ab in node list 920 contains a bit vector 926. This bit vector 926 indicates the records in the database 500 which have the value A in the Division column 502 and the value ab in the Laboratory column 504. This bit vector 926 has bits 5 through 8 on and bits 1 through 4 and 9 through 15 off. This indicates that records 5 through 8 in the database 500 contain the value A in the division column 502 and the value ab in the laboratory column 504. In a similar manner, Laboratory level node list 920 will also have a bit map 928 associated with value aa, the Laboratory level node list 922 will have bit maps for values ba, bb, and bc, and the Laboratory level node list 924 will have bit maps for values ca and cb.

Again, similar to the Division level node list 906, the Laboratory level node lists 920, 922, 924 also contain pointers to the node lists which subordinate each unique value. Thus, for the value ab in the Laboratory level node list 920, there is a pointer 930 to a Department level node list 932. Referring back to FIG. 6 it is seen that Laboratory node ab 610 is subordinated by Department nodes ab1 616, ab2 618, and ab3 620. Thus, the Department level node list 932 contains the values ab1, ab2, and ab3.

In a similar manner, the value aa in Laboratory level node list 920 will have a pointer 934 to a Department level node list containing the values aa1 and aa2. The value ba in the Laboratory level node list 922 will have a pointer 936 to a Department level 214 node list containing the values ba1 and ba2. The value bb in the Laboratory level node list 922 will have a pointer 938 to a Department level node list containing the value bb1. The value bc in the Laboratory level node list 922 will have a pointer 940 to a Department level node list containing the value bc1. The value ca in the Laboratory level node list 924 will have a pointer 942 to a Department level node list containing the value ca1. The value cb in Laboratory level node list 924 will have a pointer 944 to a Department level node list containing the value cb1.

Once again in a similar manner to the Division level and Laboratory level node lists, each value in the Department level node lists have associated bit vectors. For example, the bit vector for the value ab1 946 in the Department level node list 932 indicates the records in the database 500 which contain the value A in the Division column 502, the value ab in the Laboratory column 504, and the value ab1 in the Department column 506. Thus, the bit vector 946 has bits 5 and 6 on, and bits 1 through 4 and 7 through 15 off. Referring to FIG. 5, the bit vector information indicates that records 5 and 6 contain these values. The bit vectors associated with values ab2 and ab3 in node list 932 convey similar information. All Department level node lists would contain similar bit vectors.

Note that the Department level node list 932 entries do not point to any subordinating node lists. This is because the Department level 214 is at the bottom of the ORGANIZATION hierarchy 200 (FIG. 2). However, if the Department level 214 had subordinating levels the Department level node lists would point to other node lists. Thus, it is seen that the node lists contain pointers to subordinate levels until the bottom of the hierarchy is reached.

Returning now to the Tree List 900, in a manner similar to that described for the ORGANIZATION hierarchy 200, the ACCOUNT and PROJECT hierarchies 300, 400 will each have three levels of node lists associated with them. Thus, ACCOUNT in tree list 900 would have a pointer 903 to an Account level 302 node list. PROJECT in tree list 900 would have a pointer 904 to a Customer level 402 node list. This would be clear to one skilled in the art from the prior discussion in connection with FIG. 9.

Although three hierarchies are defined in the example, only two may be displayed on the screen at one time. In the following discussion it is assumed that the ORGANIZATION hierarchy is displayed on the row dimension and the PROJECT hierarchy is displayed on the column dimension. The dimension layout and associated bit vectors for the ORGANIZATION tree are shown in FIG. 10. The process of developing a dimensional layout flows from the bottom to the top of the hierarchy. All of the values at a level are listed, then the superordinate value is listed, until at the end of the layout the hierarchy name itself is listed. This can be seen in FIG. 10, in the layout section 1002. A bit vector is developed for each entry in the layout. The bit vectors are shown in FIG. 10 in the bit vector section 1004. These bit vectors are developed as discussed in connection with FIG. 9. Note that the bit vector for the hierarchy itself 1008 has all bits on. This is because all records make up this hierarchy. In this example the layout 1002 for the ORGANIZATION tree will be represented in the row dimension on the display.

FIG. 11 shows the layout and associated bit vectors for the PROJECT hierarchy. The layout is shown in the layout section 1102. The bit vector for each entry in the layout is indicated in the bit vector section 1104. In the present example, the layout 1102 will be represented in the column dimension on the display.

Figure 12:
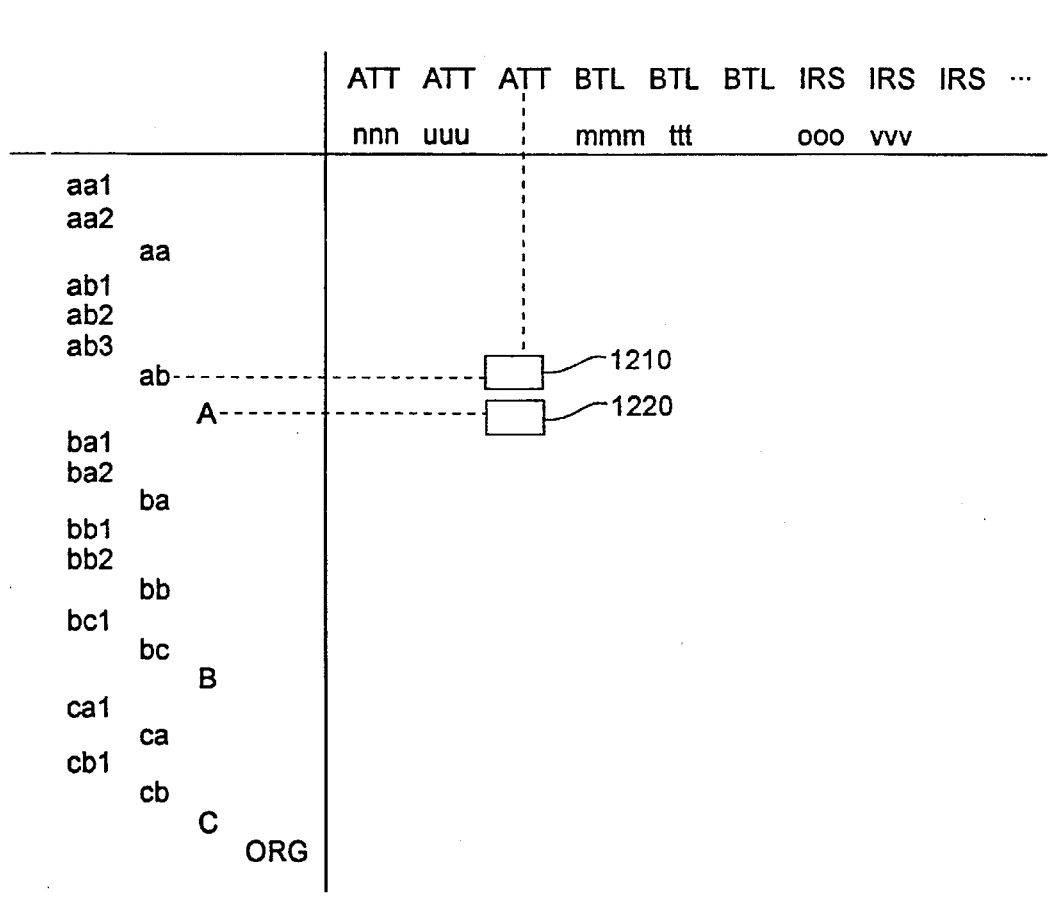
FIG. 12 shows a spreadsheet display.

FIG. 12 shows the display of the ORGANIZATION hierarchy being spread against the PROJECT hierarchy. The ORGANIZATION hierarchy is shown in the row dimension and the PROJECT hierarchy is shown in the column dimension. An entry in a layout may represent a bottom level (a Department or a Project); an intermediate level (a Laboratory), a top level (a Division or a Customer), or the grand total level, being the name of the hierarchy itself (in this example, ORGANIZATION or PROJECT). Each position at the intersection of a row and column is called a cell. Cells therefore may represent any combination of intersections of bottom levels through grand total levels.

For example, in FIG. 12, a first cell 1210 is located at the intersection of Division A, Laboratory ab in the ORGANIZATION hierarchy and Customer ATT in the PROJECT hierarchy. Thus, cell 1210 represents the intersection of an intermediate level in the ORGANIZATION hierarchy and a top level in the PROJECT hierarchy. The value which will be displayed in cell 1210 is determined as follows.

First, the bit vector for Division A, Laboratory ab is obtained. This bit vector is shown in FIG. 10 at 1006. Next, the bit vector for customer ATT is determined. This bit vector is shown in FIG. 11 at 1106. These two bit vectors are then operated on by performing a boolean AND operation on the two bit vectors as follows:

```
Div. = A, Lab = ab   000011110000000
Cust. = ATT          001000100010001
Cell Vector          000000100000000
```

The resulting bit vector has bit 7 set to on and bits 1 through 6 and 8 through 15 set to off. This bit vector, which represents the intersection of a row and column, is called a cell vector. There is only one record at this intersection of the ORGANIZATION hierarchy and PROJECT hierarchy. This is record 7. Record 7 is the only record which has Division= A, Laboratory=ab, and Customer=ATT. Therefore the value in the quantity field of record 7 will be displayed in cell 1210. With reference to FIG. 5, the Amount shown in record 7 is 543.00. Thus, 543.00 would be displayed at cell 1210.

An example of the intersection of two top levels is shown with reference to a second cell 1220 in FIG. 12. Cell 1220 is the intersection of the Division A level in the ORGANIZATION hierarchy, and the Customer ATT level in the PROJECT hierarchy.

The process for determining the bit vector for cell 1220 is as described in connection with cell 1210. The Division A bit vector 1010 is ANDed with the Customer ATT bit vector 1106 as shown:

```
Div. = A      111111110000000
Cust. = ATT   001000100010001
Cell Vector   001000100000000
```

The resulting cell vector has bits 3 and 7 set to on and bits 1, 2, 4 through 6, and 8 through 15 set to off. Since bits 3 and 7 are on, the value in cell 1220 will be the sum in the Amount fields of records 3 and 7. Thus the number 880.00 will be displayed in cell 1220.

Figure 13:
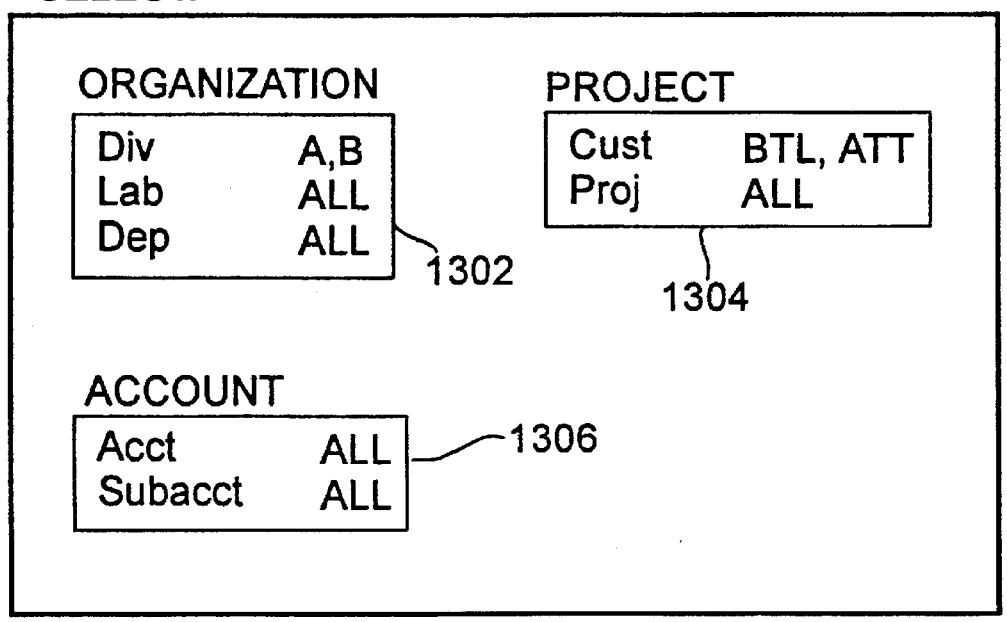
FIG. 13 shows an example of selection criteria.
Figure 14:
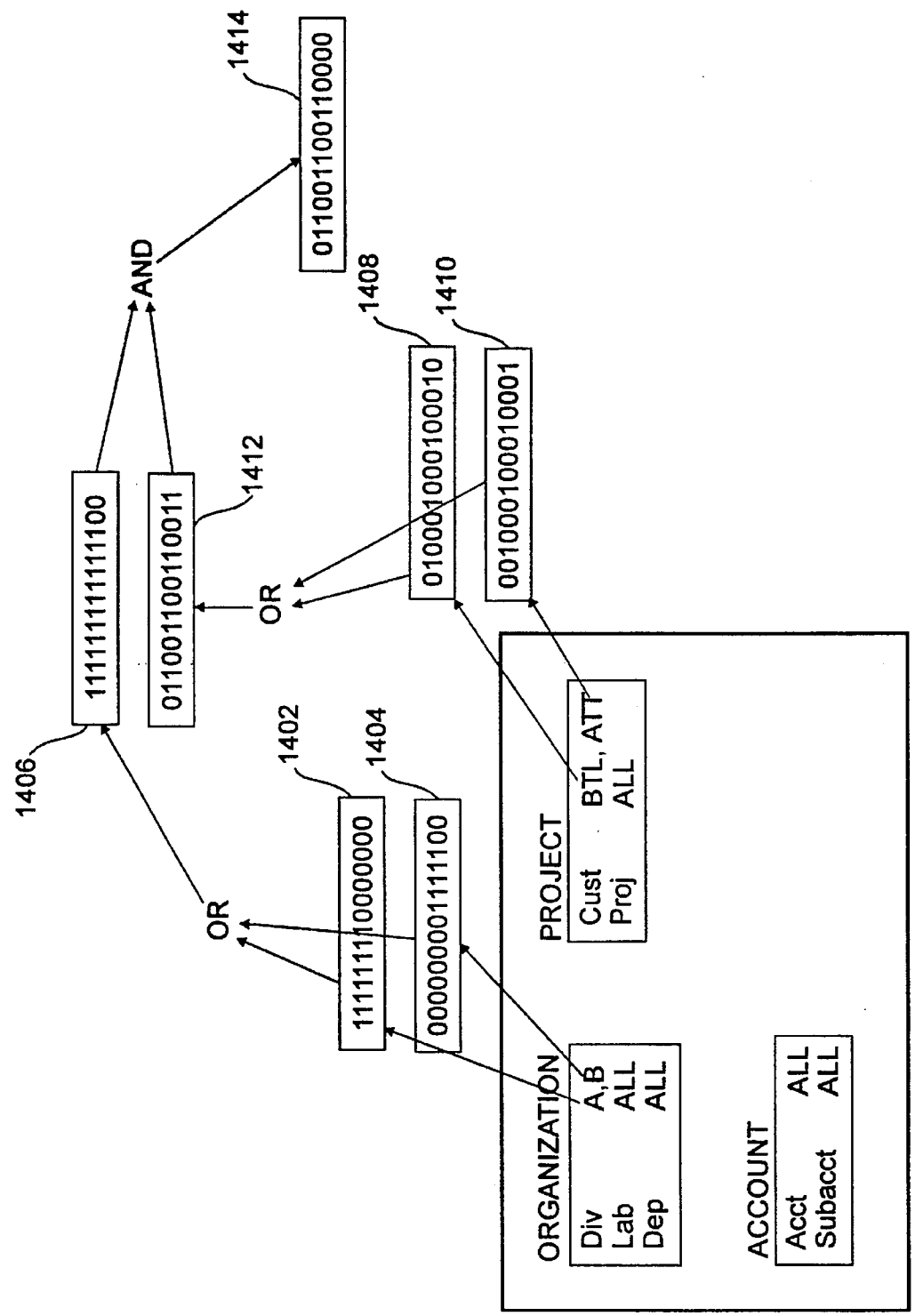
FIG. 14 shows the generation of a select bit vector.

The spreadsheet representation may be reduced by subsetting nodes in one or more of the hierarchies. This selection of nodes may be made regardless of whether the hierarchy is one of the two being displayed in the row and column dimensions of the display. For example, the user may specify that only Divisions A and B be displayed in the layout. Similarly, the user may specify that specific customers, such as only Customers BTL and ATT be displayed. This selection criteria is shown in FIG. 13. The ORGANIZATION hierarchy selection area 1302 indicates that Division will be limited to A and B. This is indicated by "A,B" next to the Div. field name. All Laboratories and all Departments are to be displayed. This is indicated by ALL next to these field names. The PROJECT hierarchy selection area 1304 indicates that the display will be limited to customers BTL and ATT. All Projects will be displayed. No selection criteria has been entered in the ACCOUNT hierarchy selection area 1306, and as a result all Accounts and all Subaccounts have been selected. When the display is completed, it will not contain any values for records containing Division C or Customers WFO or IRS. This process of selecting certain records based on selection criteria is accomplished by creating a select vector. The select vector is produced as follows, as illustrated in conjunction with FIG. 14.

First, the bit vectors for any selected values are identified. These bit vectors are developed as discussed above in connection with FIG. 9. In the ORGANIZATION hierarchy Divisions A and B were selected. Thus, two bit vectors are identified. The bit vector for Division A 1402 and the bit vector for Division B 1404 are then ORed together to produce a bit vector 1406 representing the selected records for the ORGANIZATION hierarchy.

A bit vector representing the selected records for the PROJECT hierarchy is created in a similar manner. The bit vector for customer BTL 1408 is identified and the bit vector for customer ATT 1410 is identified. These bit vectors are then ORed together to produce a bit vector 1412 representing the selected records for the PROJECT hierarchy. Since no select criteria was entered for the ACCOUNT hierarchy, no bit vector is produced. The two bit vectors 1406, 1412 representing the selected records for the ORGANIZATION hierarchy and the PROJECT hierarchy are then ANDed together to produce the select bit vector 1414. The final select vector 1414 has bits 2, 3, 6, 7, 10 and 11 set to on and bits 1, 4, 5, 8, 9, 12, 13, 14 and 15 set to off. The bits set to on correspond to each record which satisfies the selection criteria. As can be seen from FIG. 5, only records 2, 3, 6, 7, 10 and 11 have Division equal to A or B and Customer equal to BTL or ATT. This select bit vector 1414 is then used to reduce the row and column dimension layouts.

Figure 15:
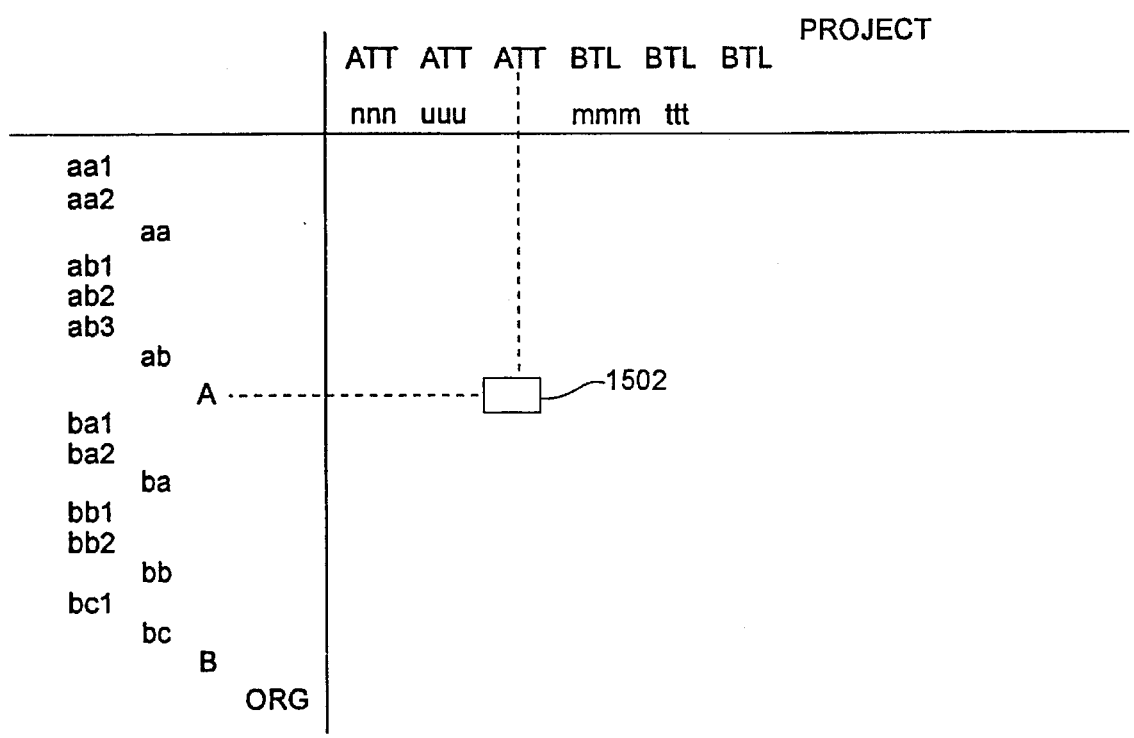
FIG. 15 shows a spreadsheet display.

The presentation on the display screen with the selection criteria of FIG. 13 is shown with reference to FIG. 15. Only the selected Divisions and Customers are displayed in the layout. The intersection of Division A and Customer ATT is shown in FIG. 15 at cell 1502. The bit vector for cell 1502 is computed as shown below:

```
Division A:      111111110000000
CUSTOMER ATT:    001000100010001
SELECT VECTOR:   011001100110000
Cell Bit Vector  001000100000000
```

The bit vector for Division A, the bit vector for customer ATT and the select bit vector are all ANDed together to produce the cell bit vector. The cell bit vector indicates that records 3 and 7 have Division=A, Customer=ATT, and also satisfy the selection criteria. The sum of the amount fields of records 3 and 7 is 888.00. Thus, 888.00 would be displayed at cell 1502.

As explained above, the spreadsheet representation may be reduced by subsetting nodes of a given hierarchy regardless of whether that hierarchy is one of the two being displayed in the row and column dimensions of the display. Referring to FIG. 15, although the Account hierarchy is not displayed in either the row or column dimension, selection criteria could be entered for the Account hierarchy. For example, the Account value could be limited to Acct=33. If this were the case, then the bit vector representing the selected records for the ACCOUNT hierarchy would be: 001000000000010. If we assume the same select criteria for the ORGANIZATION hierarchy and the PROJECT hierarchy as that shown in FIG. 13, then the bit vector representing the selected records for the ORGANIZATION hierarchy is: 111111111111100. Similarly, the bit vector representing the selected records for the PROJECT hierarchy is 011001100110011. The select bit vector is then produced by ANDing together the bit vectors representing the selected records for the ACCOUNT, ORGANIZATION and PROJECT hierarchies as shown below:

```
ACCOUNT:        001000000000010
ORGANIZATION:   111111111111100
PROJECT:        011001100110011
Select Vector:  001000000000000
```

Thus, the only record with Division=A or B, Customer=BTL or ATT, and Account=33, is Record 3. This is represented by the select bit vector having only bit 3 in the on state.

Referring back to FIG. 15 and cell 1502, the computation of the cell bit vector with the new select criteria is shown below:

```
DIVISION A:     111111110000000
CUSTOMER ATT:   001000100010001
SELECT:         001000000000000
Cell Vector:    001000000000000
```

The cell vector for cell 1502 has only bit number 3 in the on state. Thus, the value displayed at cell 1502 will be 345.00, which is the amount in record 3. This example shows how selection criteria in a hierarchy not displayed in the row or column dimension on the screen, here the ACCOUNT hierarchy, will still affect the value at the intersection of the displayed rows and columns. In the example shown, the intersection of Division A and Customer ATT was limited by selecting only records with Account=33.

Figure 16:
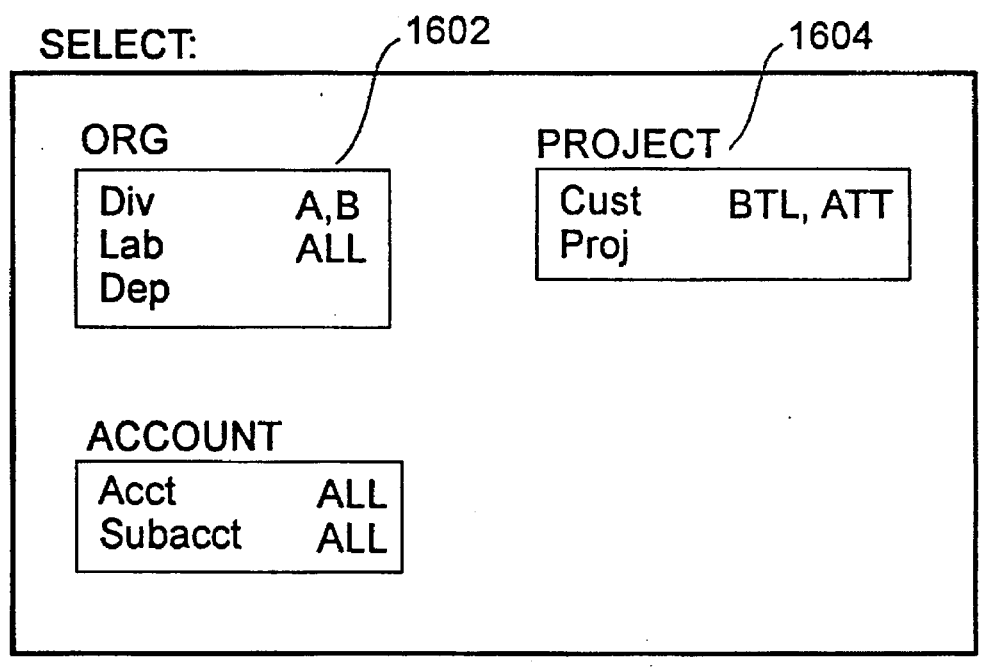
FIG. 16 shows an example of selection criteria.

The selection criteria mechanism may also be used to prune the display from the bottom up, reducing the detail level of the spreadsheet. FIG. 16 shows the same select criteria as that in FIG. 13, except that in FIG. 16 the Department value in the ORGANIZATION hierarchy selection area 1602 is blank and the Project value in the PROJECT hierarchy selection area 1604 is blank. This indicates that Department and Project are not to be displayed in the spreadsheet representation on the screen. Note that by blanking out the Department and Project levels the result is a reduction of the detail level of the spreadsheet representation on the screen. Blanks in the selection screen, however, do not change the select bit vector. Thus, if all other selection criteria is satisfied, all Departments and Projects will be included in the higher level detail levels although they will not be displayed themselves in the spreadsheet representation. The spreadsheet display for the selection criteria shown in FIG. 16 is shown in FIG. 17. In the row dimension only the Division and Laboratory levels, along with the summary level (ORG), are shown. The Department detail level has been omitted. Similarly, in the column dimension only the Customer level, along with the summary level (PROJECT), is shown. The project detail level has been omitted.

Another aspect of the present invention is that it has the capability of changing values at intermediate or grand summary levels and pro rating the changes across all detail levels. If the value of an individual item is changed, all summary totals that include that item are changed. If the value of a summary total is changed, all individual figures that make up that total will be proportionally pro rated. Thus, when a change is made in the quantity in a cell the ratio of the change is applied to the quantities in all of the records represented by that cells bit vector. Referring to FIG. 17, the intersection of Division A summary level in the row dimension and the Project grand summary level in the column dimension at cell 1702 contains the value 1554.00. This display is the result of the selection criteria shown in FIG. 16. If the number 1554.00 were changed to 2175.60 at the intersection of Division A and Project at cell 1702, all detail levels which make up that summary would be changed proportionately as follows.

The cell bit vector for the changed cell is used in the prorating process. As discussed previously, the cell's bit vector is the result of ANDing the Division A bit vector, the Project bit vector, and the select bit vector. This is shown below:

| | |
|---|---|
| DIVISION A: | 111111110000000 |
| PROJECT: | 111111111111111 |
| SELECT: | 011001100110000 |
| Cell Vector: | 011001100000000 |

The resulting cell vector has bits 2, 3, 6 and 7 set to on and bits 1, 4, 5 and 8 through 15 set to off. This indicates that the change made to the cell 1702 will be prorated across records 2, 3, 6 and 7. The ratio of the change is determined by dividing the new value by the original value in the cell. Here the ratio of change is 1.4 (2175.60÷1554.00). Thus the quantity in the amount field of records 2, 3, 6 and 7 will be increased by a factor of 1.4. Thus, the Amount in record 2 will change from 234 to 327.60. The Amount in record 3 will change from 345 to 483. The Amount in record 6 will change from 432 to 604.80. The Amount in record 7 will change from 543 to 760.20. The resulting spreadsheet display is shown in FIG. 18.

Figure 20:
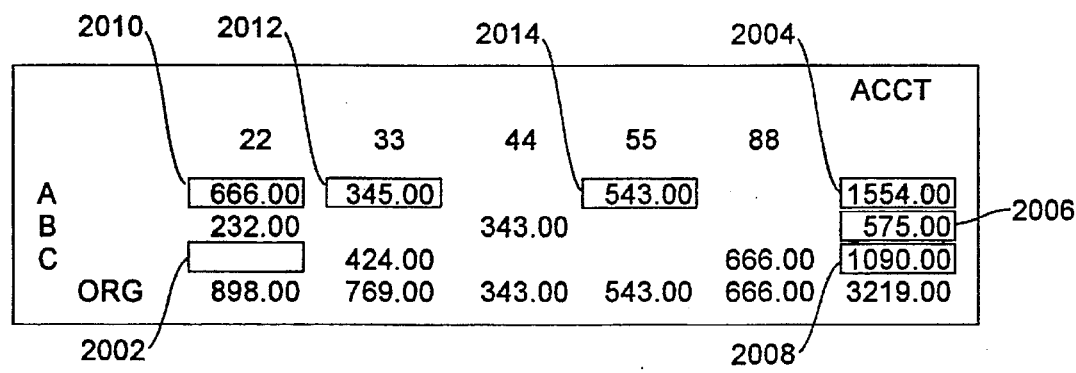
FIG. 20 shows a spreadsheet display for the selection criteria shown in FIG. 19.

It is possible that a cell in a spreadsheet display will be empty. For example, assume the selection criteria shown in FIG. 19 and assume that the ORGANIZATION hierarchy is displayed in the row dimension and that the ACCOUNT Hierarchy is displayed in the column dimension. The spreadsheet display for this selection criteria is shown in FIG. 20. The intersection of Division C and Account 22 at cell 2002 is empty in the display. This is the result of there being no records in the database 500 which have both Division=C and Account=22. In other words, this cell 2002 has a nonexistent intersection. In certain circumstances, it may be desired to add a number to an intersection in the spreadsheet which is currently empty. When a number is added to a cell where no records intersect, new records must be added to the database and the bit vectors must be expanded to accommodate them. This will be shown in the following example.

Figure 21:
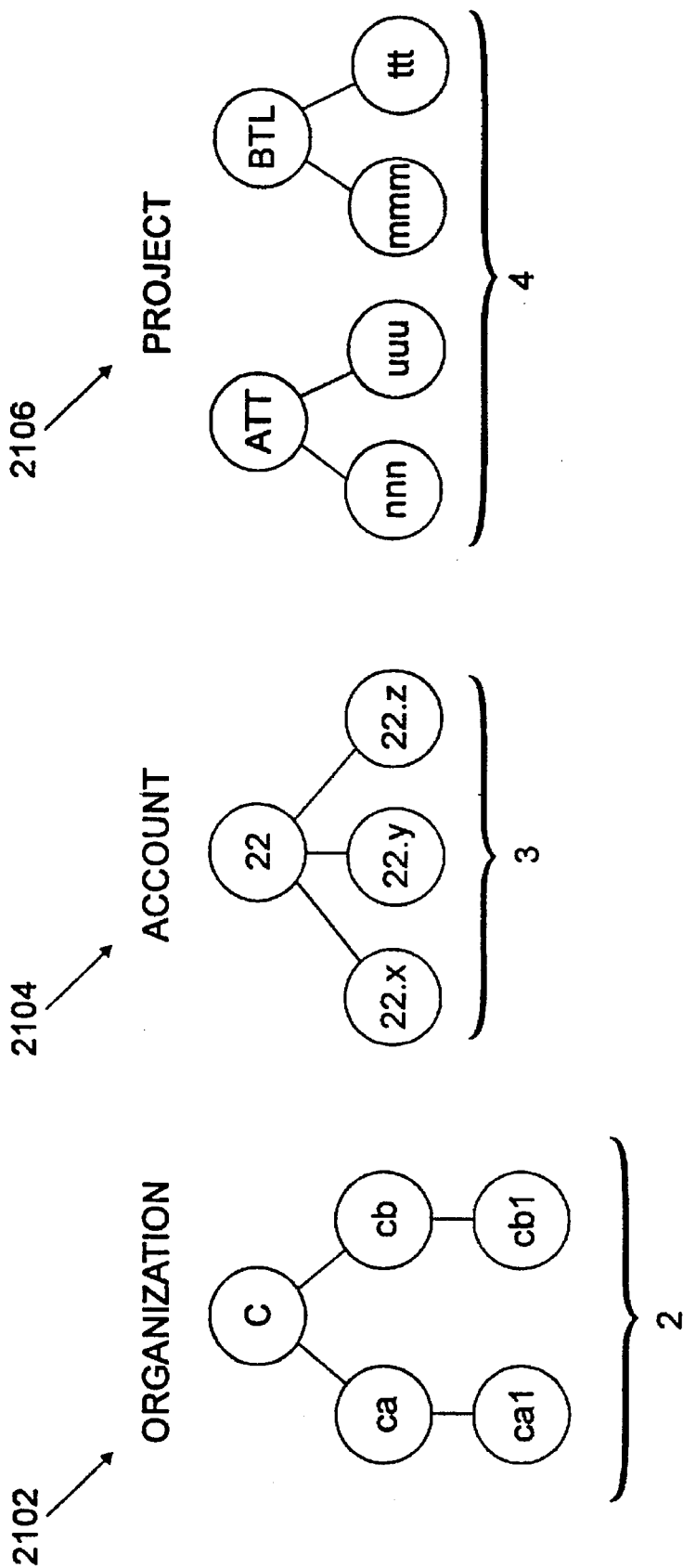
FIG. 21 illustrates the determination of various combinations of records when a value is added to an empty cell.

Assume the value 384.00 is to be added at the cell 2002 which is currently empty at the intersection of Division C and Account 22. In the data, no records exist with these values in common, so blank records must be created to bring this intersection of data into existence. New records must be added to the data for every possible combination of the three hierarchies. The ORGANIZATION hierarchy will be analyzed first. The new value was entered at cell 2002 which has the row dimension at the Division level. The Division at this cell is Division C. Thus, all possible ORGANIZATION combinations with Division=C must be determined. As shown in FIG. 21 at 2102, there are two such combinations. The first combination is Division C, Laboratory ca, Department ca1. The second such possible record is Division C, Laboratory cb, Department cb1. Thus, there are two possible combinations in the ORGANIZATION hierarchy with Division=C.

Returning to FIG. 20, the added value at cell 2002 is at Account 22 in the column dimension. Thus, every possible combination with Account 22 must be determined. There are three possible combinations for the ACCOUNT hierarchy with an Account=22. This is shown in FIG. 21 at 2104. There are three possible records, Account 22 along with subaccounts 22.X, 22.Y, and 22.Z.

The PROJECT hierarchy is not displayed on the screen. However, the selection criteria as shown in FIG. 19 restricts this hierarchy to Customers with a value of either ATT or BTL. Thus, for the PROJECT hierarchy there are four possible combinations as shown in FIG. 21 at 2106.

Thus, in order to evenly spread the new amount of 384.00 across all possible combinations of the three hierarchies, 24 new records must be created in the data. These 24 new possible combinations are shown added to the database as records 16–39 in FIG. 22 at 2202. Each of these records will receive an amount of 16.00 in the Amount field. This amount is 384.00 divided by 24, the number of records added.

Before the new records were added to the database the bit vectors were 15 bits wide corresponding to the number of records existing at that time. After the new records are added, the total number of records is 39. Thus, all bit vectors are extended to 39 bits wide to accommodate the newly added records. All affected bit vectors must be updated to show the new intersections. The spreadsheet is then recalculated.

Another aspect of the present invention is the ability to define formulas for display in the spreadsheet. Formulas may be defined using the Various quantity fields in the database. For example, suppose the database as shown in FIG. 5 with the modification that the quantity fields are BUDGET and COST instead of AMOUNT. These are the quantities which may be used to create formulas. First, a Label is defined, which specifies a label to be displayed for each column calculated with the corresponding formula. The formula itself is an algebraic expression using the quantity field names along with the following mathematical operators:

| | |
|---|---|
| * | for multiplication |
| / | for division |
| + | for addition |
| − | for subtraction. |

If a quantity field name is used alone, without any mathematical operators, then the value in that field will be displayed. Parentheses "( )" are used to enclose portions of an expression and to set up the sequence in which it is evaluated. Brackets "[ ]" are used to indicate the summation portions of an expression. Brackets must be used because the formulas are used to calculate both individual and summary totals. The use of brackets is illustrated below:

Suppose the following simple spreadsheet with a formula for the % Spent column.

| | Budget | Cost | % Spent |
|---|---|---|---|
| Dept A | 10 | 8 | |
| Dept B | 20 | 12 | |
| Total | 30 | 20 | |

The following mathematical expression provides a correct calculation of %Spent for each individual value:

$$100*(Cost/Budget)$$

However, if this formula is used, the summary total (140%) will not be correct, as shown in the following spreadsheet:

| | Budget | Cost | % Spent |
|---|---|---|---|
| Dept A | 10 | 8 | 80 |
| Dept B | 20 | 12 | 60 |
| Total | 30 | 20 | 140 |

To avoid an incorrect summary total, brackets [ ] are used to indicate the portions of the formula to be added together prior to the evaluation of the rest of the formula:

$$100=([Cost]/[Budget])$$

This form of the expression provides correct calculations for both the individual values and the summary total, as shown in the following spreadsheet:

| | Budget | Cost | % Spent |
|---|---|---|---|
| Dept A | 10 | 8 | 80 |
| Dept B | 20 | 12 | 60 |
| Total | 30 | 20 | 66.7 |

The difference between the two forms of the expression in this example can also be demonstrated from a mathematical standpoint.

$$100 * (Cost/Budget) = 100 * \Sigma(Cost/Budget)$$

$$100 * ([Cost]/[Budget]) = 100 * (\Sigma Cost/\Sigma Budget)$$

Using the figures from the spreadsheet above, then $$100 * \Sigma(Cost/Budget) = 100 * (8/10 + 12/20) = 140\%$$

while $$100 * (\Sigma Cost/\Sigma Budget) = 100 * ((8+12)/(10+20)) = 66.7\%$$

The second form of the expression gives the correct result.

As an example of a spreadsheet display, consider the database of FIG. 5, with the modification of the quantity fields as described above. Also, assume the following formulas and labels have been defined:

| Label | Formula |
|---|---|
| BUDGET | Budget |
| UNEXPENDED | Budget-Cost |

Figure 23:
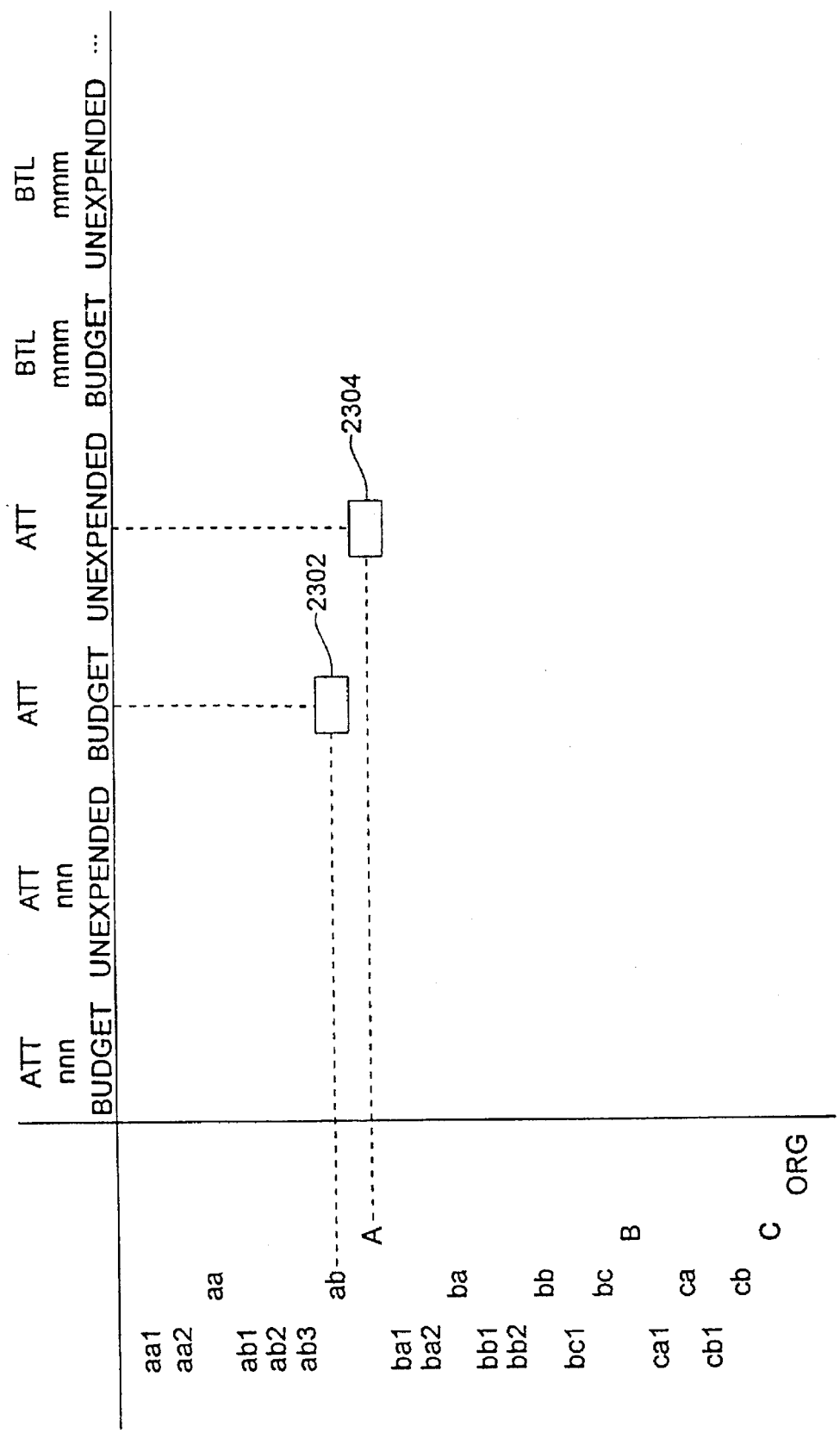
FIG. 23 shows a spreadsheet display illustrating the use of labels and formulas.

The spreadsheet display would be as shown in FIG. 23. Cell values would be computed as follows. The bit map for cell 2302 is computed as shown below:

| | |
|---|---|
| Div. = A, Lab = ab | 000011110000000 |
| Cust. = ATT | 001000100010001 |
| Cell Vector | 000000100000000 |

The cell vector has only bit number 7 set to on. Thus, cell 2302 would display the value in the BUDGET field of database record number 7.

With respect to cell 2304, its cell vector is computed as shown below:

| | |
|---|---|
| Div. = A | 111111110000000 |
| Cust. = ATT | 001000100010001 |
| Cell Vector | 001000100000000 |

That cell vector has bits 3 and 7 set to on. Assuming that records 3 and 7 had the following values in their Budget and Cost fields:

| | BUDGET | LOST |
|---|---|---|
| Record No. 3 | 10 | 5 |
| Record No. 7 | 15 | 8 | then cell 2304 would be computed as (10−5)+(15−8)=12. Thus, 12 would be displayed at cell 2304.

Another aspect of the present invention is its unique graphics features. The first feature is analysis graphics. When a user chooses this feature, the user is presented with a menu displaying the key fields in the database. Thus, with reference to the database 500 shown in FIG. 5, the user will be able to choose one of the key fields Div. 502, Lab. 504, Dep. 506, Acct. 508, Subacct. 510, Cust. 512, or Proj. 514. After a field is chosen, a graph is displayed showing the values and quantities for that field. In addition, the analysis graphics feature will take into account whether there are any selection criteria entered by the user.

Figure 24:
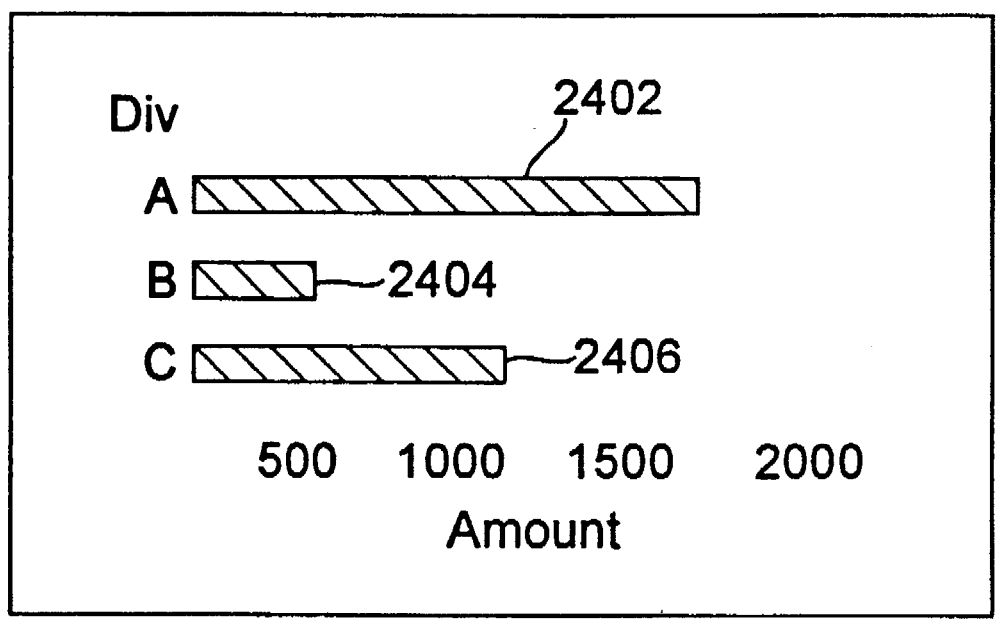
FIG. 24 shows the display of a bar graph.

For example, assume the database 500 as shown in FIG. 5, the selection criteria as shown in FIG. 19, and the display as shown in FIG. 20. Further, assume the user chose the Div. field to be graphed. The analysis graphics display would be as shown in FIG. 24. What is shown in FIG. 24 are the values and quantities of the Div. field of the ORGANIZATION hierarchy, as was displayed on the Row dimension in FIG. 20. Thus, bar 2402 in FIG. 24 represents the value 1554.00 as shown in the spreadsheet of FIG. 20 at 2004. Similarly, bar 2404 and 2406 represent the values in FIG. 20 at 2006 and 2008 respectively. FIG. 24 shows a bar chart. However, the data may be displayed in other types of charts such as pie charts, line charts, area charts and stacked and cluster bar charts for representing data with multiple quantities. These, and other graphical representation can be readily implemented by one skilled in the art.

Figure 25:
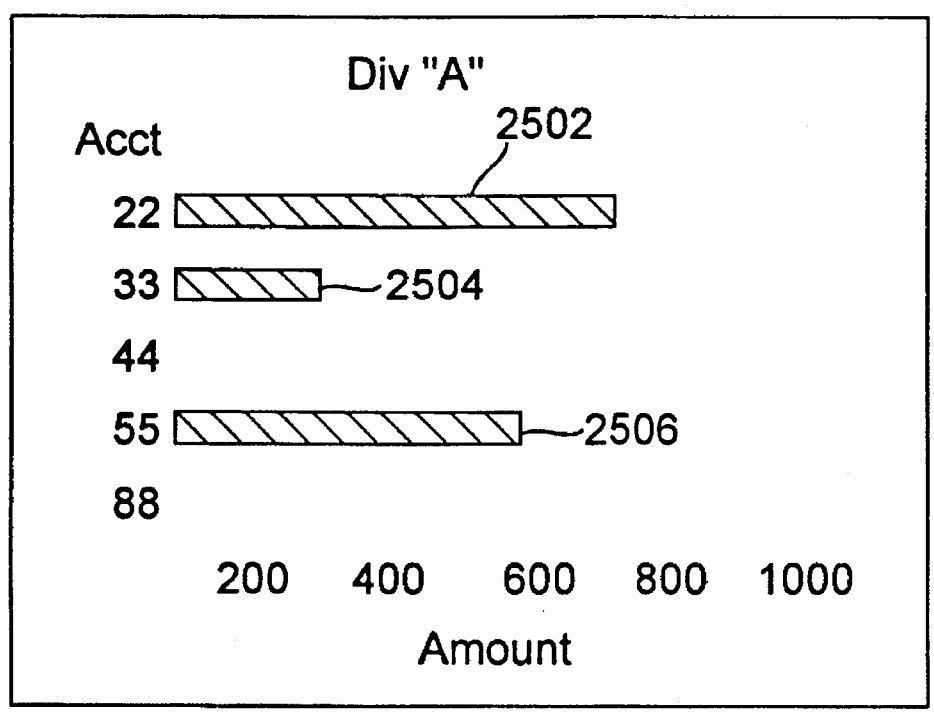
FIG. 25 shows the display of a bar graph.

The user may choose to subset one of the Divisions shown in the graph of FIG. 24 by any of the remaining key fields in the database. For example, if the user chose to subset Division A by the Account field, a chart of the Account Node would be displayed, as shown in FIG. 25. In this example, bars 2502, 2504, and 2506, represent the values in FIG. 20 shown by 2010, 2012, and 2014 respectively.

The chart shown in FIG. 25, may be further subsetted. The user may choose any of the Accounts shown in FIG. 25, and may subset the chosen account by any of the remaining key fields. For example, the user may choose to subset Account 55 by the Customer field. The chart of FIG. 26 would then be displayed.

Figure 26:
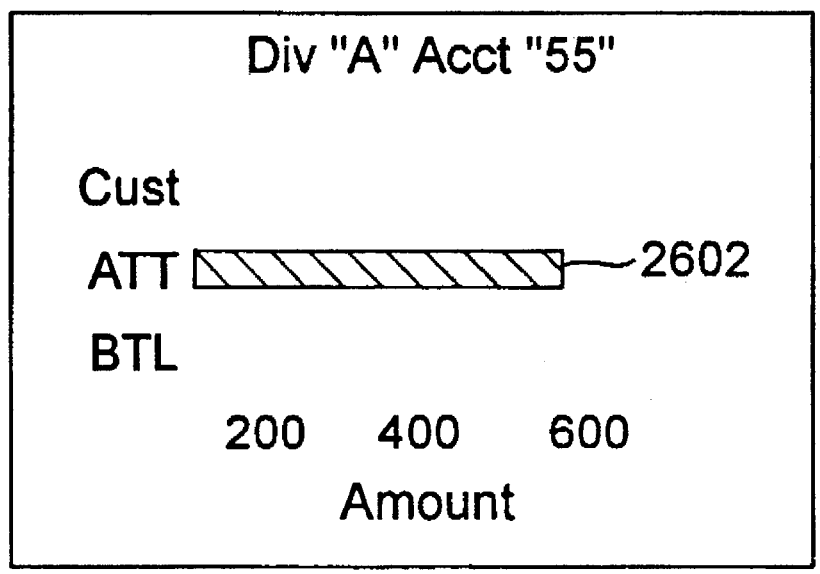
FIG. 26 shows the display of a bar graph.

Another feature of the graphics ability of the present invention is the ability to manipulate a graphics display with a resulting change in the underlying data. For example, consider the graph shown in FIG. 26. The intersection of Division=A, Account=55, and Customer=ATT, only occurs at record number 7, as shown in FIG. 5, and as represented in FIG. 26 by the bar 2602 extending horizontally to represent the value of 543.00, which is the value in the quantity field of record 7. The user may change the quantity field in record 7 by changing the length of the horizontal bar 2602 in the graphic display. The means for the user manipulating the graphical display may be of any suitable type well known in the art, such as by use of a mouse 108 (FIG. 1). After the bar 2602 has been manipulated by the user, the system will update the Amount field of record number 7 to reflect the change.

In addition, graphical representation of summary levels may also be modified, and the change will be prorated across all detail records which make up that summary level. For example, referring back to FIG. 24, the bar 2402 represents the sum of values in the Amount field of records 2, 3, 6 and 7. This is a result of the selection criteria shown in FIG. 19. Thus, if the bar 2402 were manipulated, as discussed above, the system would determine the new summary value and would prorate this change across records 2, 3, 6 and 7. This proration is as discussed previously.

Data may also be represented in a proportional graph such as a pie-chart. For example, using the data from FIG. 5, a pie-chart could be constructed showing each Division as a piece of a pie-chart. If the values in the Amount field for each Division are added, the following is the result:

| | | |
|---|---|---|
| Division A = 3099 | 55% | |
| Division B = 1463 | 26% | |
| Division C = 1090 | 19% | |

Figure 27:
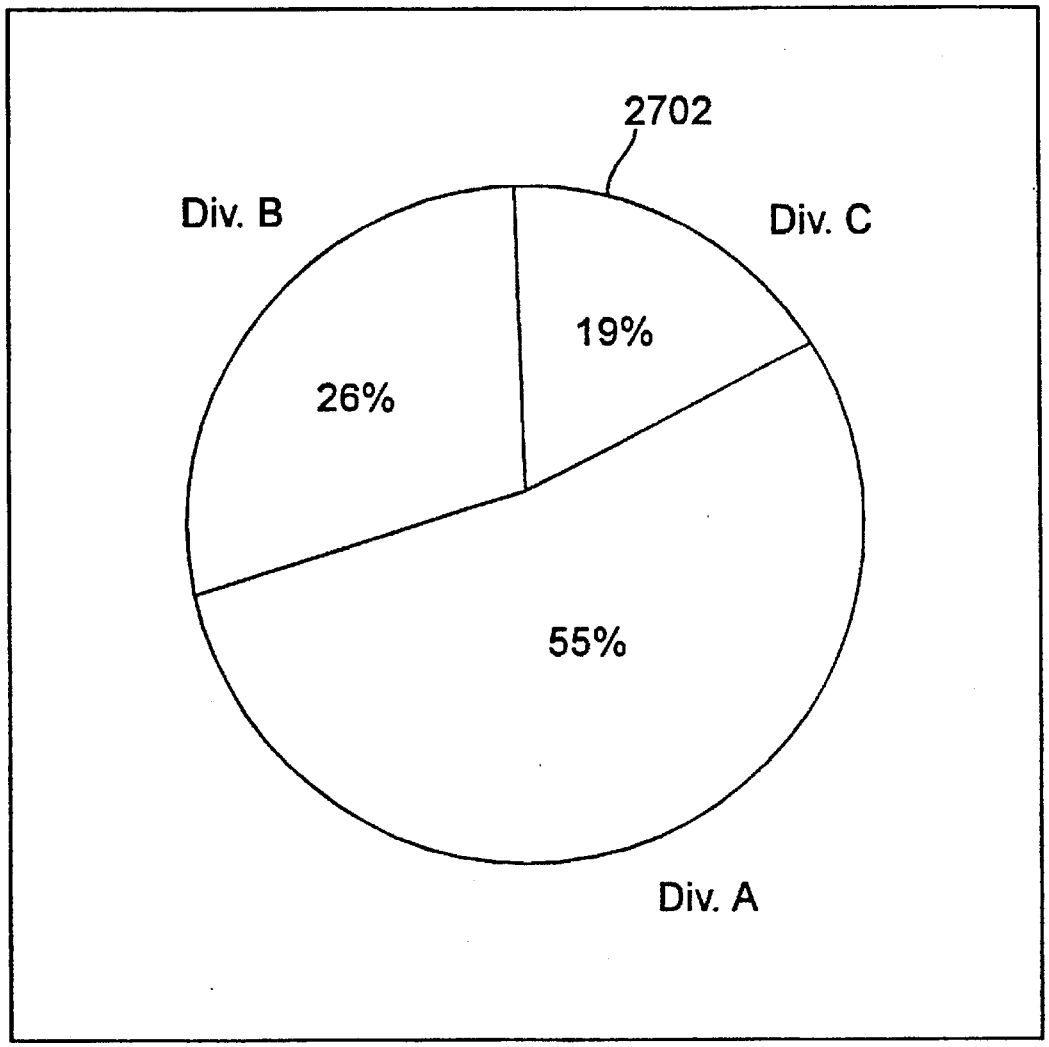
FIG. 27 shows the display of proportional graphics.

The pie-chart which illustrates the proportional value of each division is shown in FIG. 27.

Figure 28:
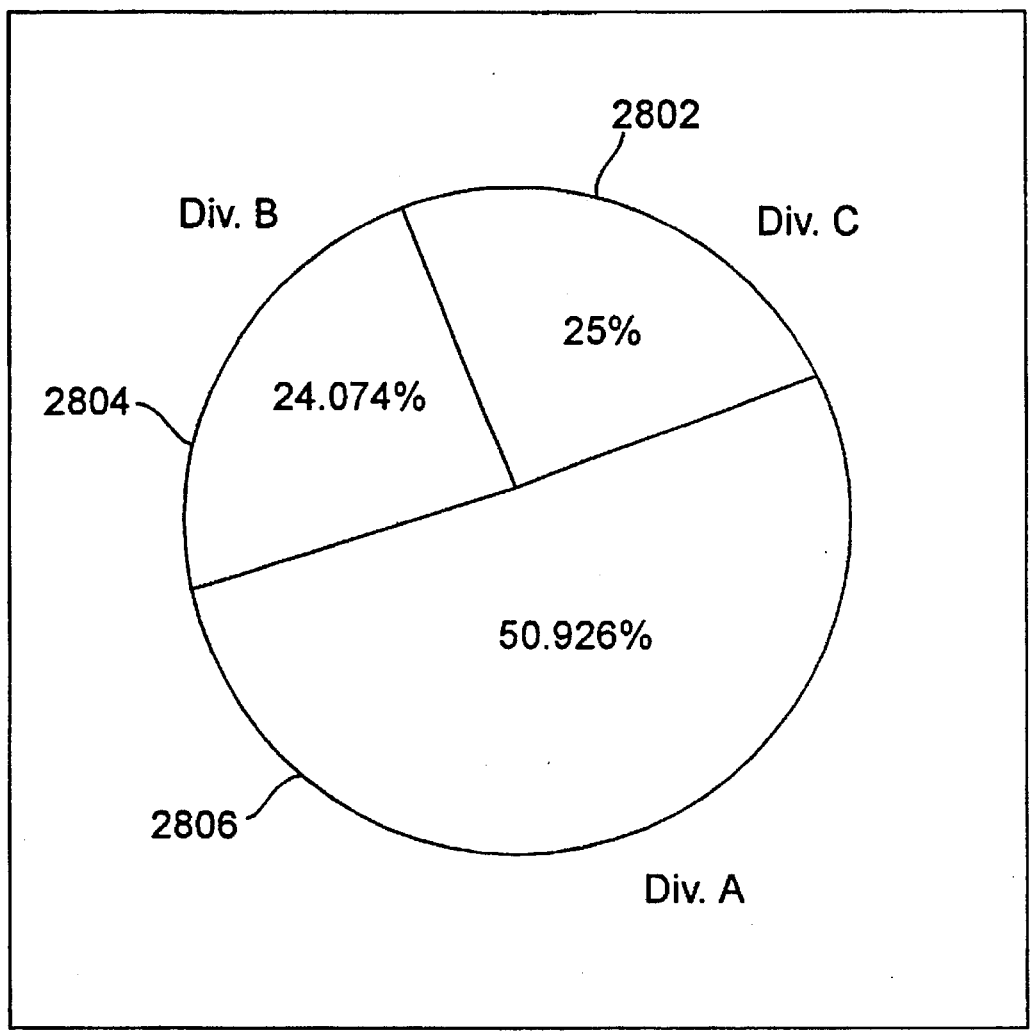
FIG. 28 shows the display of proportional graphics after a user modification.

A user may change the proportional value of one of the portions of the chart. Thus, a user could choose the portion of the pie-chart representing Division C 2702 and enlarge it to 25%. This would represent a 6% increase. Thus, each of Division B and Division C would be decreased by its proportional share of 6%. Since Division A and B together represent 81%, Division A's proportional share of the 6% is calculated as $6 \times {}^{55}/_{81} = 4.074\%$, and Division B's proportional share of the 6% is calculated as $6 \times {}^{26}/_{81} = 1.926$. Thus, Division A will be decreased by 4.074% and Division B will be decreased by 1.926%. The resulting graph would be as shown in FIG. 28. Div. C 2802 shows 25%, Div. B 2804 shows 24.074% (26−1.926), and Div. A 2806 shows 50.926% (55−4.074). In addition to changing the graph, the underlying data is also changed. Thus, the Amount field of records 1–8, each of which have Division=A, will be reduced by 4.074%. The Amount field of records 9–13, each of which have Division=B, will be reduced by 1.926%. The Amount field of records 14 and 15, each of which have Division=C will be increased by 6%.

The ability to change database records to reflect corresponding changes in various graphical displays, is a result of the present invention's unique use of bit vectors to represent the relationship between data items.

Another aspect of the present invention is its multiprint capability. As an example of this capability, consider the spreadsheet shown in FIG. 12, which shows the display of the ORGANIZATION hierarchy being spread against the PROJECT hierarchy. Assuming no selection criteria, the spreadsheet would reflect all the records present in the database 500. The multiprint capability allows a user to generate spreadsheet reports based upon the fields of a hierarchy which is not displayed on the screen. This is called the driving hierarchy. For example, in FIG. 12, the ACCOUNT hierarchy is not displayed on the screen. Thus, the ACCOUNT hierarchy would be used as the driving hierarchy for the multiprint function. If there were other hierarchies not displayed on the screen, the user could choose one of them as the driving hierarchy. The multiprint function generates a separate printout for each combination of unique values of the fields in the driving hierarchy, and generates a printout for the summary levels of the driving hierarchy.

In the present example, there are 8 unique values for the Account field: 11, 22, 33, 44, 55, 66, 77, and 88. There are two unique combinations of values with Account=11. These are Account=11, Subacct=11.x and Account=11, Subacct=11.y. The first printout generated by the multiprint function would be a spreadsheet with the ORGANIZATION hierarchy being spread against the PROJECT hierarchy and only including in the representation those records containing 11 in the Account field and 11.x in the Subacct field. The second printout generated would include only those records containing 11 in the Account field and 11.y in the Subacct field. The third printout would represent the Account=11 summary level and would include all records with Account=11 regardless of the values in the Subacct field. The generation of reports would continue in this manner for each combination of unique values in the ACCOUNT hierarchy, and for each summary level. A grand summary level report is also produced. Thus, 22 reports would be printed:

| Report # | Account | Subacct |
|---|---|---|
| 1 | 11 | 11.x |
| 2 | 11 | 11.y |
| 3 | 11 | ALL |
| 4 | 22 | 22.x |
| 5 | 22 | 22.y |
| 6 | 22 | 22.z |
| 7 | 22 | ALL |
| 8 | 33 | 33.y |
| 9 | 33 | 33.z |
| 10 | 33 | ALL |
| 11 | 44 | 44.x |
| 12 | 44 | 44.y |
| 13 | 44 | ALL |
| 14 | 55 | 55.z |
| 15 | 55 | ALL |
| 16 | 66 | 66.x |

-continued

| Report # | Account | Subacct |
| --- | --- | --- |
| 17 | 66 | ALL |
| 18 | 77 | 77.y |
| 19 | 77 | ALL |
| 20 | 88 | 88.x |
| 21 | 88 | ALL |
| 22 | ALL | ALL |

The number of reports which are generated by the multiprint function may be reduced by including selection criteria in the multiprint request. Reports would be generated only for those combinations of values in the driving hierarchy which satisfy the selection criteria. For example, if a user entered selection criteria for the Account field and selected only Accounts=22 or 33, then only reports 4–10 and 22 would be printed. Reports 4–10 are the only reports in which the value in the Account field equals 22 or 33, and report 22 is the grand summary level report.

The above described multiprint capability is implemented through the use of select bit vectors as described above in connection with FIGS. 13 and 14. The multiprint capability could be readily implemented by one skilled in the art given the above description. This multiprint capability is made possible by the present inVention's unique use of bit vectors.

It is to be understood that the embodiments and variations shown and described herein are illustrative of the principles of this invention only and that various modifications may be implemented by those skilled in the art without departing from the scope and spirit of the invention.

We claim:

1. A method for managing data in a computer system comprising the steps of:
    storing a plurality of data records in a memory unit, each of said data records comprising at least two key fields and a quantity field, wherein a first set of said key fields defines a first hierarchical relationship and a second set of said key fields defines a second hierarchical relationship;
    representing said first hierarchical relationship on a first dimension on a display screen and said second hierarchical relationship on a second dimension on said display screen, wherein an intersection of said first dimension and said second dimension on said display screen defines a cell including a cell bit vector;
    displaying a value in said cell, wherein said value represents the contents of the quantity fields of the data records which are represented by said cell; and
    prorating a change made to a value displayed in a cell among the quantity fields of all data records which are represented by said cell by using said cell bit vector.

2. The method of claim 1 wherein said first dimension is the row dimension and said second dimension is the column dimension.

3. The method of claim 1 further comprising the steps of:
    a user specifying selection criteria; and
    excluding from the display screen representation data records which do not satisfy said selection criteria.

4. The method of claim 3 wherein said selection criteria comprises values of said key fields.

5. The system of claim 1 further comprising the steps of:
    specifying key fields to be excluded from representation on the display screen; and
    omitting said user specified key fields from said representation of said first and second hierarchical relationships on said display screen.

6. The method of claim 1 further comprising the steps of:
    adding a value to a cell which is blank, wherein said blank cell does not represent any data records; and
    creating a plurality of new data records which represent all possible combinations of data records at the intersection of hierarchies associated with the cell;
    distributing said added value among the quantity fields of said plurality of new data records; and
    storing said new data records in said memory unit.

7. A method for managing data in a computer system comprising the steps of:
    storing a plurality of data records in a memory unit, each of said data records comprising a plurality of key fields and at least one quantity field, wherein each unique combination of values of said key fields defines a unique record;
    defining a plurality of data hierarchies based upon a plurality of sets of said key fields, each of said data hierarchies comprising:
        a plurality of levels, said number of levels being equal to the number of key fields in the set of key fields defining the hierarchy, wherein each key field in said set of key fields is associated with one level,
        wherein each of said plurality of levels comprises a plurality of nodes, said number of nodes being equal to the number of unique values present in the data records in the key field associated with that level, wherein each of said nodes represents one of said unique values;
    generating at least one node list associated with each level of each of said data hierarchies, each of said node lists comprising:
        a bit vector associated with a node of the associated level, said bit vector representing the data records which contain the unique value represented by the associated node, and
        a pointer associated with a node of the associated level, said pointer pointing to the lower level node list associated with the nodes which subordinate the associated node, if such subordinate nodes exist; and
    storing said at least one node list in a memory unit.

8. The method of claim 7 wherein each of said bit vectors has the same number of bits as the number of data records, and wherein each bit positionally represents one data record.

9. The method of claim 7 further comprising the steps of:
    identifying a first bit vector associated with a first node in a first data hierarchy;
    identifying a second bit vector associated with a second node in a second data hierarchy; and
    performing a boolean AND operation on said first and second bit vectors, wherein the resulting bit vector represents all data records associated with said first node and said second node.

10. The method of claim 7 further comprising the steps of:
    specifying a plurality of values for a first key field;
    identifying the bit vectors associated with the nodes representative of said values; and
    performing a boolean OR operation on said bit vectors, wherein the resulting bit vector represents all data records which contain said specified values.

11. The method of claim 7 further comprising the steps of:
    specifying a plurality of values for a first key field;
    specifying a plurality of values for a second key field;
    identifying the bit vectors associated with the nodes representative of said values specified for the first key field;

identifying the bit vectors associated with the nodes representative of said values specified for the second key field;

performing a boolean OR operation on said bit vectors associated with the nodes representative of said values specified for the first key field, wherein the resulting bit vector defines a first intermediate bit vector;

performing a boolean OR operation on said bit vectors associated with the nodes representative of said values specified for the second key field, wherein the resulting bit vector defines a second intermediate bit vector; and performing a boolean AND operation on said first and second intermediate bit vectors, wherein the resulting bit vector represents all data records which contain said specified values for the first and second key fields.

12. A method for the graphical display and updating of data, the method comprising the steps of:

storing data records in a memory unit, each of said data records comprising a quantity field having a bit vector;

displaying a graphical representation of the sum of the quantity fields of at least two of said data records;

manipulating said graphical representation on the display screen so as to increase or decrease the graphical representation of said sum; and proportionally updating the quantity fields of each of said at least two data records in response to the manipulation of said graphical representation using said bit vector of each of said quantity fields.

13. The method of claim 12 wherein said graphical representation is a bar chart.

14. A database reporting method comprising the steps of:

storing data records in a memory unit, each of said data records comprising a plurality of key fields and at least one quantity field and having a bit vector, wherein a first set of said key fields defines a first hierarchical relationship, a second set of said key fields defines a second hierarchical relationship, and a third set of said key fields defines a third hierarchical relationship;

identifying all unique combinations of values in said third set of key fields; and generating a plurality of reports using said bit vectors, each of said reports associated with one of said unique combinations of values, wherein each report display said first hierarchical relationship on a first dimension and said second hierarchical relationship on a second dimension, and wherein each report displays values at the intersections of said first and second dimensions, wherein said values represent the contents of the quantity fields of the data records which are represented by said intersections and which contain the unique combination of values associated with the report and are obtained using said bit vectors.

15. The method of claim 14 further comprising the step of:

generating a plurality of summary level reports, each of said summary level reports associated with a summary level in said third hierarchical relationship, wherein each of said reports displays said first hierarchical relationship on a first dimension and said second hierarchical relationship on a second dimension, and wherein each report displays values at the intersections of said first and second dimensions, wherein said values represent the contents of the quantity fields of the data records which are represented by said intersections and which are included in the associated summary level.

16. The method of claim 14 further comprising the steps of:

specifying selection criteria; and suppressing generation of reports which do not satisfy said selection criteria.

17. The method of claim 16 wherein said selection criteria comprises values of key fields in said third set of key fields.

18. A system for managing data comprising:

a computer processor;

a display monitor connected to the computer processor for the display of graphical and textual information;

textual data entry means connected to the computer processor;

graphical data entry means connected to the computer processor;

a memory unit connected to the computer processor for the storage of a plurality of data records, each of said data records comprising at least two key fields and a quantity field, wherein a first set of said key fields defines a first hierarchical relationship and a second set of said key fields defines a second hierarchical relationship;

means for representing said first hierarchical relationship on a first dimension on said display screen and said second hierarchical relationship on a second dimension on said display screen, wherein an intersection of said first dimension and said second dimension on said display screen defines a cell;

means for displaying a value in said cell, wherein said value represents the contents of the quantity fields of the data records which are represented by said cell; and means for changing the value displayed in said cell and prorating said change among the quantity fields of all data records which are represented by said cell.

19. The system of claim 18 wherein said first dimension is the row dimension and said second dimension is the column dimension.

20. The system of claim 18 further comprising:

means for allowing a user to specify selection criteria; and means for excluding from the display screen representation data records which do not satisfy said selection criteria.

21. The system of claim 20 wherein said selection criteria comprises values of said key fields.

22. The system of claim 18 further comprising:

means for allowing a user to specify key fields to be excluded from representation on the display screen; and means for omitting said user specified key fields from said representation of said first and second hierarchical relationships on said display screen.

23. The system of claim 18 further comprising:

means for adding a value to a cell which is blank, wherein said blank cell does not represent any data records; and means for creating a plurality of new data records which represent all possible combinations of data records at the intersection of hierarchies associated with the cell;

means for distributing said added value among the quantity fields of said plurality of new data records; and means for storing said new data records in said memory unit.

24. A hierarchical database system comprising:

a computer processor;

a memory unit connected to said computer processor for the storage of a plurality of data records, each of said data records comprising a plurality of key fields and at least one quantity field, wherein each unique combination of values of said key fields defines a unique record;

a plurality of sets of said key fields defining a plurality of data hierarchies, each of said data hierarchies comprising:

a plurality of levels, said number of levels being equal to the number of key fields in the set of key fields defining the hierarchy, wherein each key field in said set of key fields is associated with one level, wherein each of said plurality of levels comprises a plurality of nodes, said number of nodes being equal to the number of unique values present in the data records in the key field associated with that level, wherein each of said nodes represents one of said unique values;

at least one node list associated with each level of each of said data hierarchies, each of said node lists comprising:

a bit vector associated with a node of the associated level, said bit vector representing the data records which contain the unique value represented by the associated node; and a pointer associated with a node of the associated level, said pointer pointing to the lower level node list associated with the nodes which subordinate the associated node, if such subordinate nodes exist; and means for storing said at least one node in said memory unit.

25. The system of claim 24 wherein each of said bit vectors has the same number of bits as the number of data records, and wherein each bit positionally represents one data record.

26. The system of claim 24 further comprising:

means for identifying a first bit vector associated with a first node in a first data hierarchy;

means for identifying a second bit vector associated with a second node in a second data hierarchy; and means for performing a boolean AND operation on said first and second bit vectors, wherein the resulting bit vector represents all data records associated with said first node and said second node.

27. The system of claim 24 further comprising:

means for specifying a plurality of values for a first key field;

means for identifying the bit vectors associated with the nodes representative of said values; and means for performing a boolean OR operation on said associated bit vectors, wherein the resulting bit vector represents all data records which contain said specified values.

28. The system of claim 24 further comprising:

means for specifying a plurality of values for a first key field;

means for specifying a plurality of values for a second key field;

means for identifying the bit vectors associated with the nodes representative of said values specified for the first key field;

means for identifying the bit vectors associated with the nodes representative of said values specified for the second key field;

means for performing a boolean OR operation on said bit vectors associated with the nodes representative of said values specified for the first key field, wherein the resulting bit vector defines a first intermediate bit vector;

means for performing a boolean OR operation on said bit vectors associated with the nodes representative of said values specified for said the second key field, wherein the resulting bit vector defines a second intermediate bit vector;

means for performing a boolean AND operation on said first and second intermediate bit vectors, wherein the resulting bit vector represents all data records which contain said specified values for the first and second key fields.

29. A system for the graphical display and updating of data, the system comprising:

a computer processor;

a display monitor connected to the computer processor for the display of graphical and textual information;

textual data entry means connected to the computer processor;

graphical data entry means connected to the computer processor;

a memory unit connected to the computer processor for the storage of data records, each of said data records comprising a quantity field including a bit vector;

means for displaying a graphical representation of the sum of the quantity fields of at least two of said data records;

means for manipulating said graphical representation on the display screen so as to increase or decrease the graphical representation of said sum; and means for proportionally updating the quantity fields of each of said at least two data records in response to the manipulation of said graphical representation, said means comprising using said bit vector of each of said quantity fields.

30. The system of claim 29 wherein said graphical representation is a bar chart.

31. A database reporting system comprising:

a computer processor;

a display device connected to the computer processor for the display of graphical and textual information;

a memory unit connected to the computer processor for the storage of data records, each of said data records comprising a plurality of key fields and at least one quantity field and having a bit vector, wherein a first set of said key fields defines a first hierarchical relationship, a second set of said key fields defines a second hierarchical relationship, and a third set of said key fields defines a third hierarchical relationship;

means for identifying all unique combinations of values in said third set of key fields; and means for generating a plurality of reports using said bit vectors, each of said reports associated with one of said unique combinations of values, wherein each report displays said first hierarchical relationship on a first dimension and said second hierarchical relationship on a second dimension, and wherein each report displays values at the intersections of said first and second dimensions, wherein said values represent the contents of the quantity fields of the data records which are represented by said intersections and which contain the unique combination of values associated with the report and are obtained using said bit vectors.

32. The system of claim 31 further comprising:

means for generating a plurality of summary level reports, each of said summary level reports associated with a summary level in said third hierarchical relationship, wherein each of said reports displays said first hierarchical relationship on a first dimension and said second hierarchical relationship on a second dimension, and wherein each report displays values at the intersections of said first and second dimensions, wherein said values represent the contents of the quantity fields of the data records which are represented by said intersections and which are included in the associated summary level.

33. The system of claim 21 further comprising:

means for specifying selection criteria; and means for suppressing generation of reports which do not satisfy said selection criteria.

34. The system of claim 33 wherein said selection criteria comprises values of key fields in said third set of key fields.

* * * * *